United States Patent
Pao et al.

(10) Patent No.: US 11,582,745 B2
(45) Date of Patent: Feb. 14, 2023

(54) METHOD FOR BWP OPERATING AND USER EQUIPMENT USING THE SAME

(71) Applicant: Industrial Technology Research Institute, Hsinchu (TW)

(72) Inventors: Wei-Chen Pao, Hsinchu County (TW); Chien-Min Lee, Taoyuan (TW); Jen-Hsien Chen, Chiayi County (TW)

(73) Assignee: Industrial Technology Research Institute, Hsinchu (TW)

( * ) Notice: Subject to any disclaimer, the term of this patent is extended or adjusted under 35 U.S.C. 154(b) by 74 days.

(21) Appl. No.: 16/990,950

(22) Filed: Aug. 11, 2020

(65) Prior Publication Data

US 2021/0051640 A1  Feb. 18, 2021

Related U.S. Application Data

(60) Provisional application No. 62/886,362, filed on Aug. 14, 2019.

(51) Int. Cl.
*H04W 72/04* (2009.01)
*H04W 72/08* (2009.01)
*H04W 72/044* (2023.01)

(52) U.S. Cl.
CPC ..... *H04W 72/044* (2013.01); *H04W 72/0413* (2013.01); *H04W 72/085* (2013.01)

(58) Field of Classification Search
CPC ......... H04W 52/0206; H04W 72/0413; H04W 72/085; H04W 72/0453; H04W 76/27; H04W 72/044; H04W 72/042; H04W 52/0209; H04W 76/28; H04W 76/38; Y02D 30/70
See application file for complete search history.

(56) References Cited

U.S. PATENT DOCUMENTS

| | | | |
|---|---|---|---|
| 10,524,142 B2 | 12/2019 | Kusashima et al. | |
| 11,470,676 B2* | 10/2022 | Chen | H04W 76/20 |
| 2019/0103954 A1 | 4/2019 | Lee et al. | |
| 2019/0124558 A1 | 4/2019 | Ang et al. | |
| 2019/0132110 A1 | 5/2019 | Zhou et al. | |
| 2019/0254110 A1 | 8/2019 | He et al. | |
| 2019/0306739 A1 | 10/2019 | Kim et al. | |
| 2020/0029316 A1 | 1/2020 | Zhou et al. | |
| 2020/0037248 A1* | 1/2020 | Zhou | H04B 7/022 |
| 2020/0229081 A1* | 7/2020 | Ang | H04B 7/0626 |

(Continued)

FOREIGN PATENT DOCUMENTS

| | | |
|---|---|---|
| EP | 3478019 | 5/2019 |
| TW | 201941656 | 10/2019 |
| WO | 2019184857 | 10/2019 |

OTHER PUBLICATIONS

"Search Report of Europe Counterpart Application", dated Oct. 30, 2020, p. 1-p. 11.

(Continued)

*Primary Examiner* — Maharishi V Khirodhar
*Assistant Examiner* — Kenneth P Hunt
(74) *Attorney, Agent, or Firm* — JCIPRNET

(57) ABSTRACT

A method for bandwidth part (BWP) operating of a serving cell, adapted to a user equipment (UE) in a first BWP, is provided. The method includes: receiving a signaling; and determining whether to switch to a second BWP from the first BWP according to the signaling.

17 Claims, 29 Drawing Sheets

Activated state, operate as a normal/regular cell (e.g., UE may perform UL/DL communication and CSI measurement with active cell)

De-Activated state (e.g., UL/DL communication and CSI measurement are not needed)

Dormant state (e.g., UL/DL communication is not needed, but CSI measurement is required)

(56) References Cited

U.S. PATENT DOCUMENTS

| | | | |
|---|---|---|---|
| 2020/0314885 A1* | 10/2020 | Cirik | H04W 72/042 |
| 2021/0377852 A1* | 12/2021 | Zhou | H04W 72/042 |
| 2022/0006599 A1* | 1/2022 | Wang | H04W 72/0453 |

OTHER PUBLICATIONS

NEC, "Measurement for fast SCell activation," 3GPP TSG-RAN WG2 #106, May 2019, pp. 1-4.

"3rd Generation Partnership Project; Technical Specification Group Radio Access Network; NR; Medium Access Control (MAC) protocol specification (Release 15)," 3GPP TS 38.321 V15.6.0, Jun. 2019, pp. 1-78.

"3rd Generation Partnership Project; Technical Specification Group Radio Access Network; NR; Study on User Equipment (UE) power saving in NR (Release 16)," 3GPP TR 38.840 V16.0.0, Jun. 2019, pp. 1-74.

"3rd Generation Partnership Project; Technical Specification Group Radio Access Network; Evolved Universal Terrestrial Radio Access (E-UTRA); Medium Access Control (MAC) protocol specification (Release 15)," 3GPP TS 36.321 V15.6.0, Jun. 2019, pp. 1-133.

"LTE; Evolved Universal Terrestrial Radio Access (E-UTRA); Radio Resource Control (RRC); Protocol specification (Release 15)," 3GPP TS 36.331 V15.6.0, Jul. 2019, pp. 1-965.

LG Electronics Inc., "State transition between legacy SCell state and dormant state," 3GPP TSG-RAN2 Meeting #101bis, Apr. 2018, pp. 1-3.

CATT, CAICT, "New WID: UE Power Saving in NR," 3GPP TSG RAN Meetings #84, Jun. 2019, pp. 1-5.

CMCC, "Discussion on PDCCH-based power saving signal/channel design," 3GPP TSG RAN WG1 #97, May 2019, pp. 1-10.

"Office Action of Taiwan Counterpart Application", dated May 17, 2021, p. 1-p. 20.

CATT, "Timer based Uplink BWP Switch," 3GPP TSG-RAN WG2 Meeting #105bis, Apr. 2019, pp. 1-3.

"Office Action of Europe Counterpart Application", dated Jan. 14, 2022, p. 1-p. 6.

* cited by examiner

METHOD FOR BWP OPERATING AND USER EQUIPMENT USING THE SAME

CROSS-REFERENCE TO RELATED APPLICATION

This application claims the priority benefit of U.S. provisional application Ser. No. 62/886,362, filed on Aug. 14, 2019. The entirety of the above-mentioned patent application is hereby incorporated by reference herein and made a part of this specification.

BACKGROUND

Technical Field

The disclosure related to a method for bandwidth part (BWP) operating and a user equipment (UE) using the same.

Description of Related Art

In LTE, a UE may be configured with multiple serving cells, wherein different states (e.g., activated state, de-activated state, and/or dormant state) could be configured for each of the serving cells. FIG. 1 is a schematic diagram of a UE configured with multiple serving cells, wherein the serving cells including a primary cell (PCell) CC #0 operated in the activated state, a secondary cell (SCell) CC #1 operated in the de-activated state, and a SCell CC #2 operated in the dormant state, wherein the serving cells are controlled by a base station (e.g., eNB).

Comparing with the legacy mechanism, the SCell in the dormant state may be activated rapidly. For example, an activation delay of a SCell in the dormant state may be reduced from 34 ms to 8 ms comparing with the legacy mechanism.

FIG. 2 is a schematic diagram of a state transition of a SCell. If a SCell (except the SCell configured with physical uplink control channel (PUCCH)) is in dormant state, the SCell may be deactivated by the media access control (MAC) entity upon a timer (i.e., dormantSCellDeactivation-Timer) of the SCell expiry, wherein the same initial timer value, configured by a radio resource control (RRC) message, may be applied to each instance of the timer.

5G New Radio (NR) is a new radio access technology (RAT) developed by the 3rd Generation Partnership Project (3GPP) for the 5G mobile network. A concept of BWP operation (also referred to as BWP adaption), which is not considered in Long-Term Evolution (LTE) standard, is introduced in NR standard. A cell may be configured with multiple BWPs, as shown in FIG. 3. FIG. 3 is a schematic diagram a cell configured with multiple BWPs, wherein each of the BWPs may be configured with the same or different bandwidth or subcarrier spacing. In order to select an appropriate BWP from multiple BWPs, a method for BWP operation is required.

SUMMARY

A method for bandwidth part (BWP) operating of a serving cell, adapted to a user equipment (UE) in a first BWP, comprising: receiving a signaling; and determining whether to switch to a second BWP from the first BWP according to the signaling.

In an embodiment of the disclosure, the first BWP is one of a dormant BWP or a non-dormant BWP, and the second BWP is the other one of the dormant BWP or the non-dormant BWP.

In an embodiment of the disclosure, the signaling indicates the second BWP and the second BWP is one of a dormant BWP or a non-dormant BWP.

In an embodiment of the disclosure, the method further comprising: switching to the second BWP from the first BWP according the signaling, wherein the first BWP is a dormant BWP and the signaling indicates that the second BWP is a non-dormant BWP.

In an embodiment of the disclosure, the method further comprising: stopping a timer, not monitoring a PDCCH, performing CSI measurement and stopping uplink transmission for the serving cell when staying in the first BWP, wherein the first BWP is a dormant BWP.

In an embodiment of the disclosure, the method further comprising: switching to the second BWP from the first BWP according the signaling, wherein the second BWP is a dormant BWP; and stopping a timer, not monitoring a PDCCH, performing CSI measurement and stopping uplink transmission for the serving cell.

In an embodiment of the disclosure, the second BWP is a pre-configured BWP.

In an embodiment of the disclosure, the step of determining whether to switch to the second BWP from the first BWP according to the signaling comprising: determining not to switch to the second BWP in response to the signaling indicating the UE to stay in one of a non-dormant BWP or a dormant BWP, wherein the first BWP is corresponded to the one of the non-dormant BWP or the dormant BWP; or determining to switch to the second BWP in response to the signaling indicating the UE to stay in the one of the non-dormant BWP or the dormant BWP, wherein the first BWP is corresponded to the other one of the non-dormant BWP or the dormant BWP.

In an embodiment of the disclosure, the method further comprising: staying in the first BWP in response to determining not to switch to the second BWP.

In an embodiment of the disclosure, the method further comprising: stopping a timer in response to determining not to switch to the second BWP from the first BWP.

In an embodiment of the disclosure, the method further comprising: switching to the second BWP.

In an embodiment of the disclosure, the method further comprising: stopping a timer in response to switching to the second BWP, wherein the second BWP is a dormant BWP.

In an embodiment of the disclosure, the step of determining whether to switch to the second BWP from the first BWP according to the signaling comprising: determining whether to switch to the second BWP in response to at least one of the followings: entering a dormancy behaviour, a timer expiry, or entering a non-dormancy behaviour.

In an embodiment of the disclosure, the method further comprising: determining the second BWP from a plurality of BWPs according to at least one of the followings: a power of the UE, a bandwidth of the second BWP, a subcarrier spacing of the second BWP, a BWP identity (ID) of the second BWP, a CORESET ID corresponding to the second BWP, a search space ID corresponding to the second BWP, or a physical downlink control channel (PDCCH) monitoring occasion of the second BWP.

In an embodiment of the disclosure, the method further comprising: receiving a second signaling, wherein the second BWP is determined according to the second signaling.

In an embodiment of the disclosure, the second signaling comprises a BWP identity (ID) of the second BWP, wherein the second BWP is determined according to the BWP ID.

In an embodiment of the disclosure, the second signaling comprises a BWP hopping pattern corresponding to one or more BWPs, wherein the second BWP is determined according to the BWP hopping pattern.

In an embodiment of the disclosure, the method further comprising: transmitting a channel state information report comprising a BWP identity (ID) of the dormant BWP.

In an embodiment of the disclosure, the method further comprising: generating a channel state information report by receiving a channel state information (CSI) reference signal or performing a CSI measurement during staying in the dormant BWP.

In an embodiment of the disclosure, the method further comprising: running a BWP inactivity timer; and determining not to switch to the second BWP in response to the BWP inactivity timer expiry.

In an embodiment of the disclosure, the method further comprising: receiving a second signaling after switching to the second BWP; and starting running a timer in response to the second signaling.

A user equipment (UE) in a first bandwidth part (BWP), comprising a processor and a transceiver. The processor is coupled to the transceiver, wherein the processor is configured to: receive a signaling; and determine whether to switch to a second BWP from the first BWP according to the signaling.

In order to make the aforementioned features and advantages of the present disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the exemplary embodiments of the present disclosure and is therefore not meant to be limiting or restrictive in any manner. Also, the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
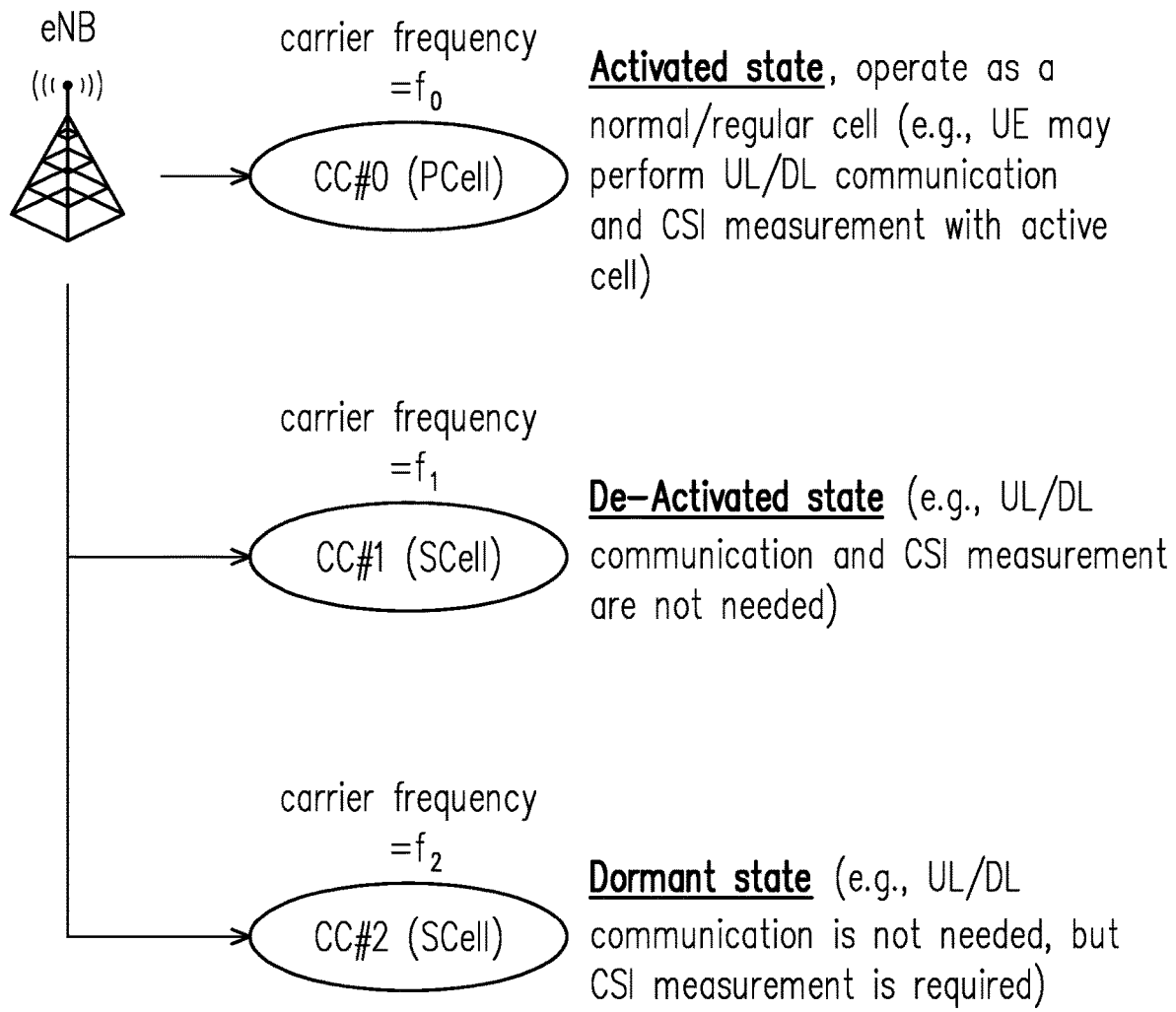
FIG. 1 is a schematic diagram of a UE configured with multiple serving cells.
Figure 2:
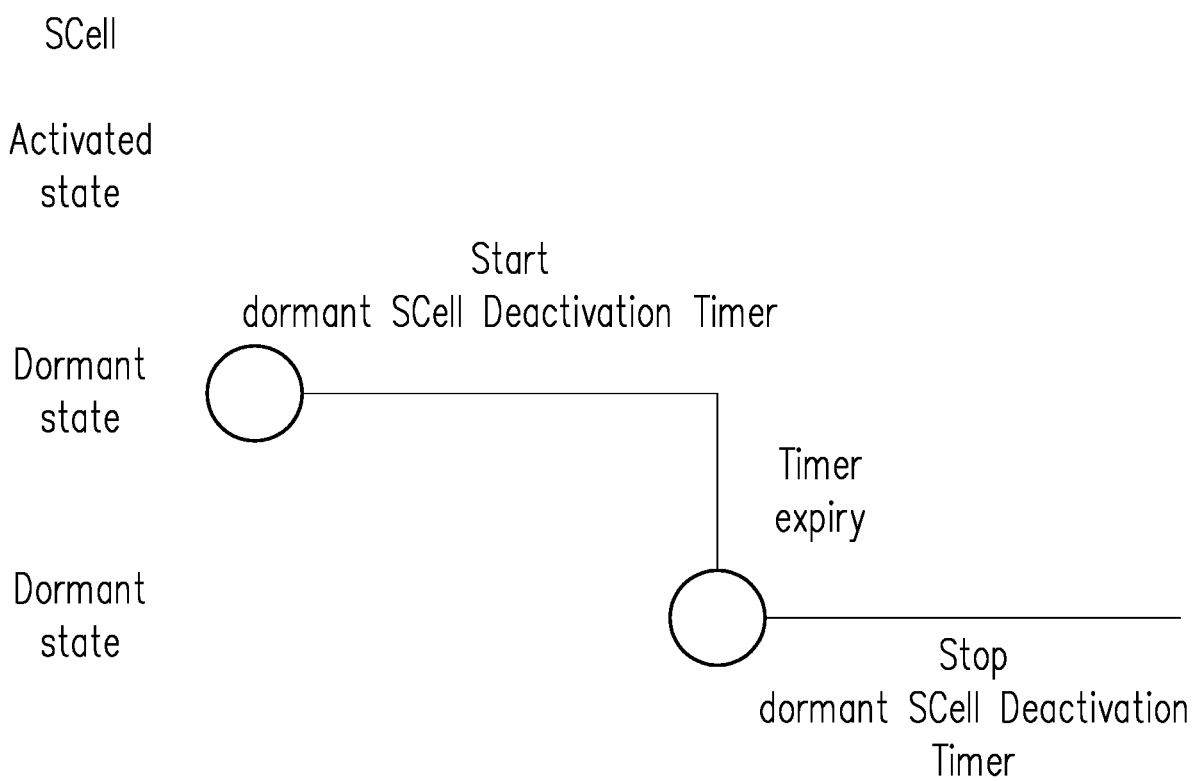
FIG. 2 is a schematic diagram of a state transition of a SCell.
Figure 3:
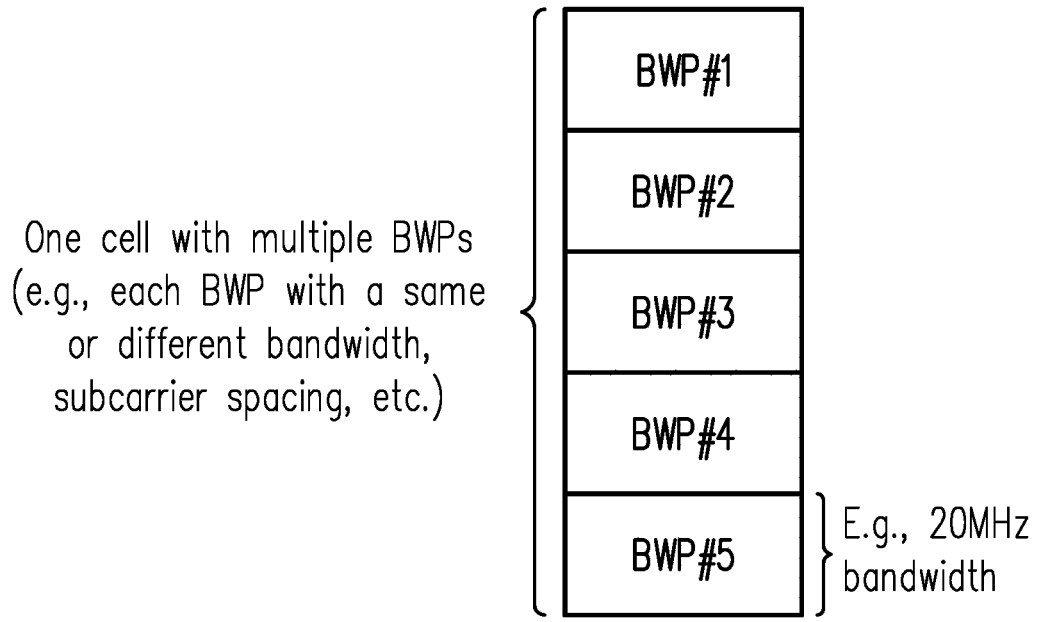
FIG. 3 is a schematic diagram a dormant SCell configured with multiple BWPs.

Reference will now be made in detail to the present exemplary embodiments of the disclosure, examples of which are illustrated in the accompanying drawings. Wherever possible, the same reference numbers are used in the drawings and the description to refer to the same or like parts.

The disclosure is directed to a method for BWP operating in a serving cell by a UE while the UE or the serving cell entering a dormant state (e.g., entering a dormant BWP, entering a dormancy behaviour) or leaving a dormant state (e.g., entering a non-dormant BWP, entering a non-dormancy behaviour), wherein the serving cell may be a SCell. For example, UE dormancy/non-dormancy behaviour for SCells may be introduced.

During stay in a non-dormant state, the UE may perform uplink (UL) or downlink (DL) communication and may perform channel state information (CSI) measurement. During stay in a dormant state, CSI measurement performed by the UE may be required, but UL or DL communication performed by the UE is not needed. If a SCell or a UE is operated in a dormant state, the UE may perform CSI measurement or may feedback CSI report without monitoring the physical downlink control channel (PDCCH) of the SCell. The CSI report for the SCell may be feedback according to the periodicity indicated by cqiRepoertPeriodic-SCell-r15 message. On the other hand, if the SCell or the UE is operated in a dormant state, a sounding reference signal (SRS) may not be transmitted on the SCell, a PDCCH may not be monitored on the SCell by the UE, a PDCCH may not be monitored for the SCell by the UE, a PUCCH may not be transmitted on the SCell, and UL transmission may not be performed on a UL shared channel (UL-SCH), a random access channel (RACH), or a PUCCH of the SCell by the UE.

Figure 4:
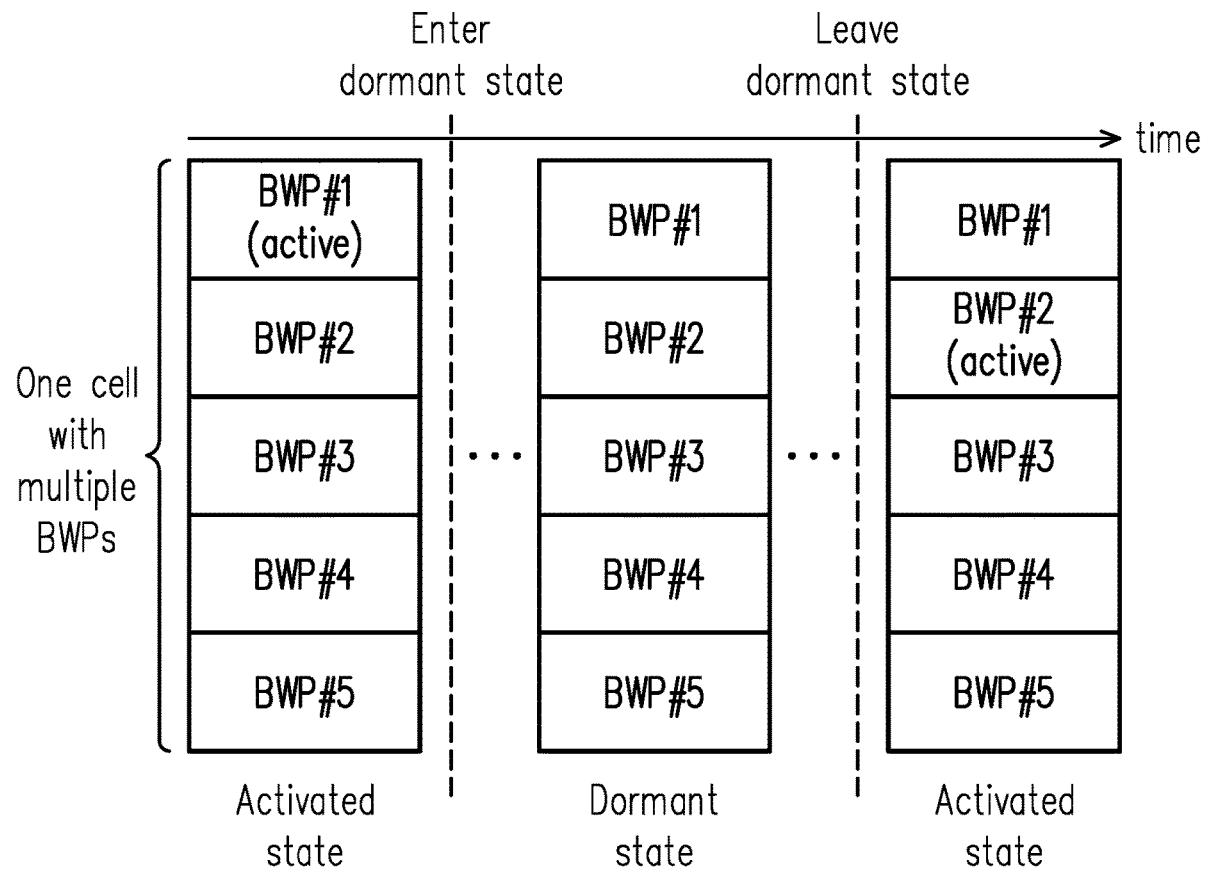
FIG. 4 is a schematic diagram of BWP configuration for a cell in the dormant state according to an embodiment of the disclosure.

FIG. 4 is a schematic diagram of BWP configuration for a cell in the dormant state according to an embodiment of the disclosure. The UE may be configured with one or more BWPs for each cell (e.g., SCell) via a higher layer signaling (e.g., a RRC message or a MAC CE (e.g., hibernation MAC CE)) or a physical layer signaling (e.g., a downlink control information (DCI)), but the disclosure is not limited thereto. A BWP configuration for the SCell in dormant state may be provided to the UE by a higher layer signaling (e.g., a RRC message or a MAC CE (e.g., hibernation MAC CE)) or a physical layer signaling (e.g., a downlink control information (DCI)). The BWP configuration may comprise, for example, a first dormant BWP, a BWP hopping pattern, or a wake-up BWP (e.g., a non-dormant BWP). The first dormant BWP is the first BWP which the UE may stay or hibernate for CSI measurement/feedback upon the SCell (or the UE) entering the dormant state. The BWP hopping pattern may correspond to one or more BWPs which may be required by the UE so as to perform CSI measurement/feedback during the dormant state. The wake-up BWP is the BWP which the UE may stay upon the SCell (or the UE) leaving the dormant state (i.e., entering a non-dormancy behaviour). The UE may monitor a DL signal (e.g., physical downlink control channel (PDCCH), reference signal, or synchronization signal block (SSB)) while staying in the wake-up BWP. If the wake-up BWP is not a specific BWP such as a default BWP, a timer such as a BWP inactivity timer of the SCell may start or re-start upon receiving a signaling via the PDCCH on the wake-up BWP. The UE may switch from a non-default BWP to a default BWP in response to the BWP inactivity timer expiry.

Figure 5:
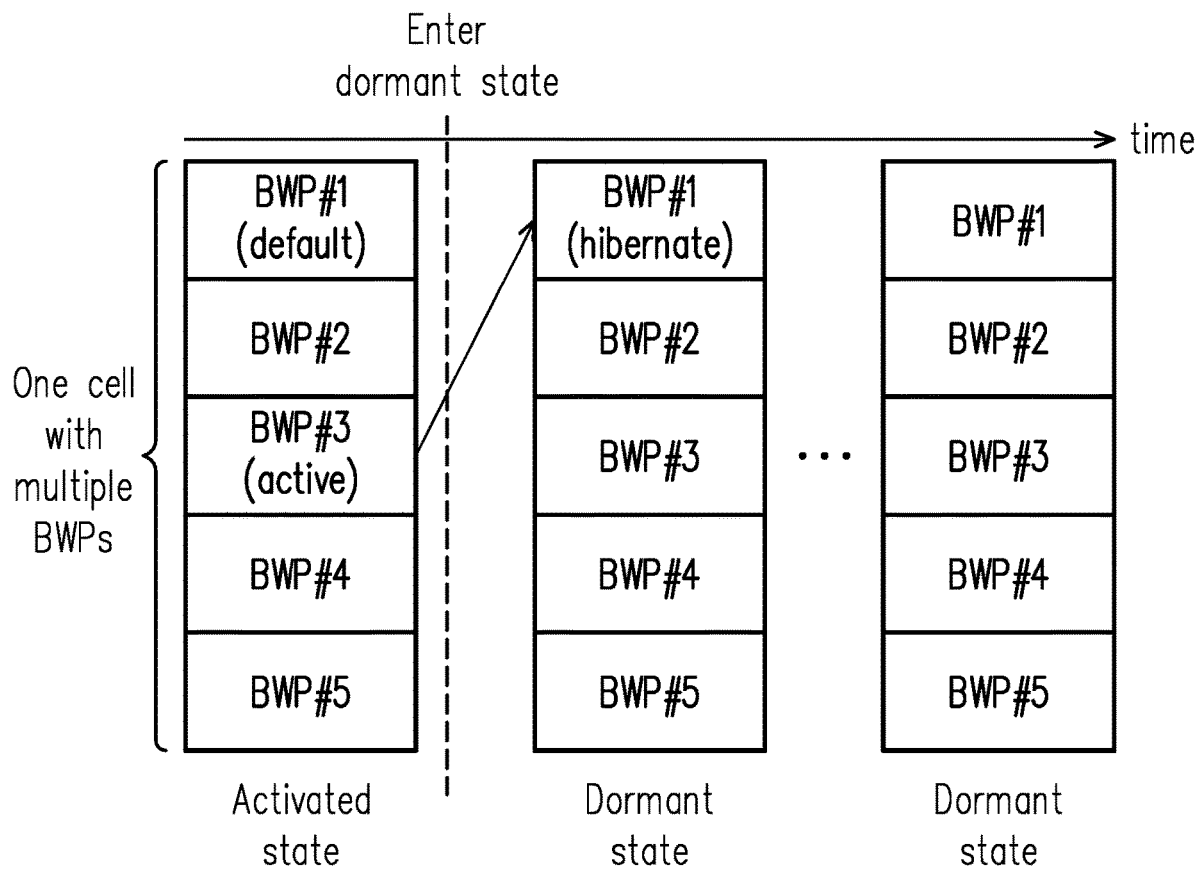
FIG. 5 is a schematic diagram of BWP operation for the UE upon the SCell entering the dormant state according to an embodiment of the disclosure.

In an embodiment, the UE may receive a signaling and may determine whether to switch from the current BWP (i.e., the BWP the UE staying in currently) of the SCell to another BWP of the SCell according to the signaling, wherein the signaling may be transmitted via a higher layer signaling (e.g., a RRC message or a MAC CE (e.g., hibernation MAC CE)) or a physical layer signaling (e.g., a downlink control information (DCI)). FIG. 5 is a schematic diagram of BWP operation for the UE upon the SCell entering the dormant state according to an embodiment of the disclosure. The UE may receive a signaling, such as RRC message, MAC CE (e.g., hibernation MAC CE), or DCI, for dormancy indication. The DCI may indicate the UE to stay in one of a dormant BWP or a non-dormant. For example, a DCI with bit value "0" may indicate the UE to stay in an active DL BWP provided by a dormant BWP for the UE for each activated SCell in the corresponding group of configured SCells. A DCI with bit value "1" may indicate the UE to stay in an active DL BWP provided by a first-non-dormant-BWP-ID-for _DCI-inside-active-time (or provided by a non-dormant BWP) for the UE for each activated SCell in the corresponding group of configured SCells. The UE may determine whether to switch to another BWP according to the received signaling upon entering the dormant state. If the current BWP (i.e., active BWP) of the UE is not a specific BWP such as a default BWP, the UE may determine to switch to the default BWP (or dormant BWP, hibernate BWP) according to the DCI in response to entering the dormant state (e.g., the dormancy behaviour) from the activated state (e.g., the non-dormancy behaviour). Referring to FIG. 5, the UE may switch from BWP #3 (i.e., active BWP) to BWP #1 (i.e., default BWP, dormant BWP or hibernate BWP) upon entering the dormant state. In some embodiment, the UE may switch to a first active (DL) BWP or an initial (DL) BWP instead of switching to the default BWP upon entering the dormant state, the disclosure is not limit thereto. A timer such as a BWP inactivity timer may stop or suspend in response to the UE switching to the default BWP or the dormant BWP. On the other hand, the BWP inactivity timer may start or re-start in response to the UE switching to a BWP which is not the default BWP upon entering the dormant state.

Figure 6:
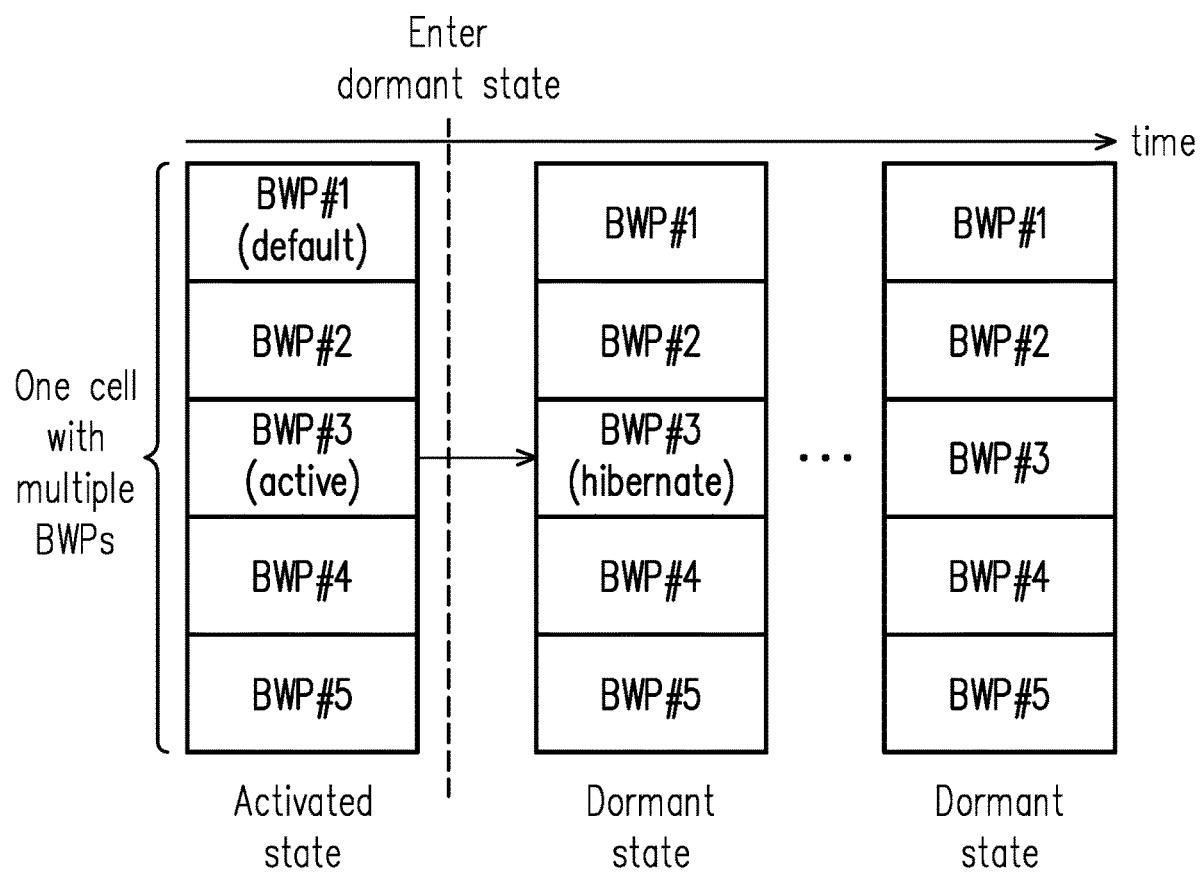
FIG. 6 is a schematic diagram of BWP operation for the UE upon the SCell entering the dormant state according to another embodiment of the disclosure.

In an embodiment, the UE may determine not to switch from the current BWP to another BWP after receiving the DCI for dormancy indication. That is, the UE may stay in the same BWP upon entering the dormant state. FIG. 6 is a schematic diagram of BWP operation for the UE upon the SCell entering the dormant state according to another embodiment of the disclosure. The base station (e.g., gNB) may or may not transmit a BWP ID of a BWP to the UE after the SCell entering the dormant state so as to indicate the UE to stay in the BWP.

In an embodiment, the UE may receive a signaling while staying in a non-dormant BWP (e.g., active BWP). If the signaling indicates the UE to stay in a non-dormant BWP, the UE may determine not to switch to another BWP since the current BWP is already a non-dormant BWP.

Figure 7:
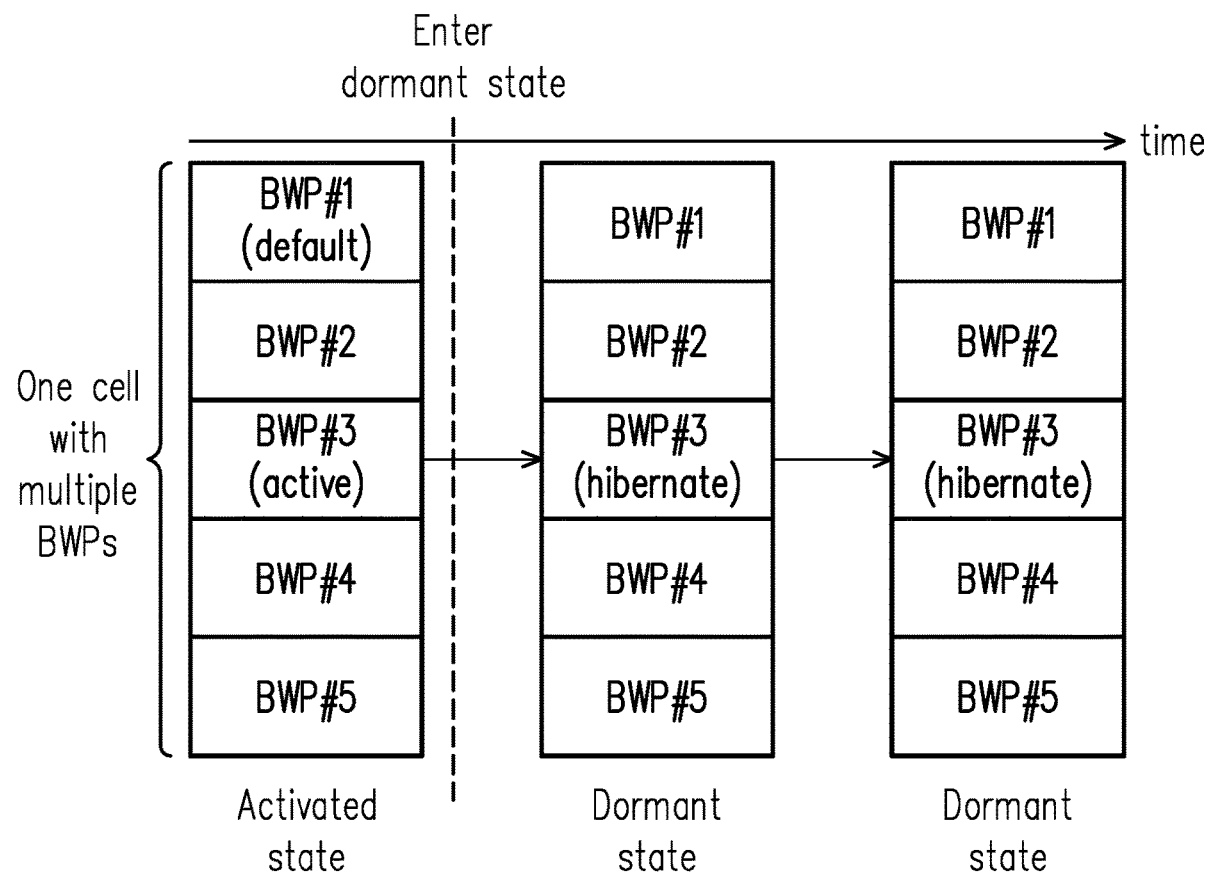
FIG. 7 is a schematic diagram of operation of BWP inactivity timer upon the SCell entering the dormant state according to an embodiment of the disclosure.

If the active BWP which the UE stays in before the SCell entering the dormant state is not a specific BWP such as a default BWP, a timer such as a BWP inactivity timer of the SCell (or the UE) may be configured to run. In an embodiment, if the BWP the UE staying in before the SCell entering to the dormant state is a non-default BWP, the UE may determine not to switch to another BWP upon the SCell entering the dormant state, and the BWP inactivity timer may stop or suspend upon the SCell entering the dormant state. FIG. 7 is a schematic diagram of operation of BWP inactivity timer upon the SCell entering the dormant state according to an embodiment of the disclosure. The BWP inactivity timer may stop or suspend upon the UE entering the dormant BWP or the SCell entering the dormant state. The UE may hibernate in BWP #3 which is the same BWP the UE staying in before the SCell entering the dormant state. The UE may hibernate in BWP #3 until leaving the dormant state or receiving further indication from the base station (e.g., gNB).

Figure 8:
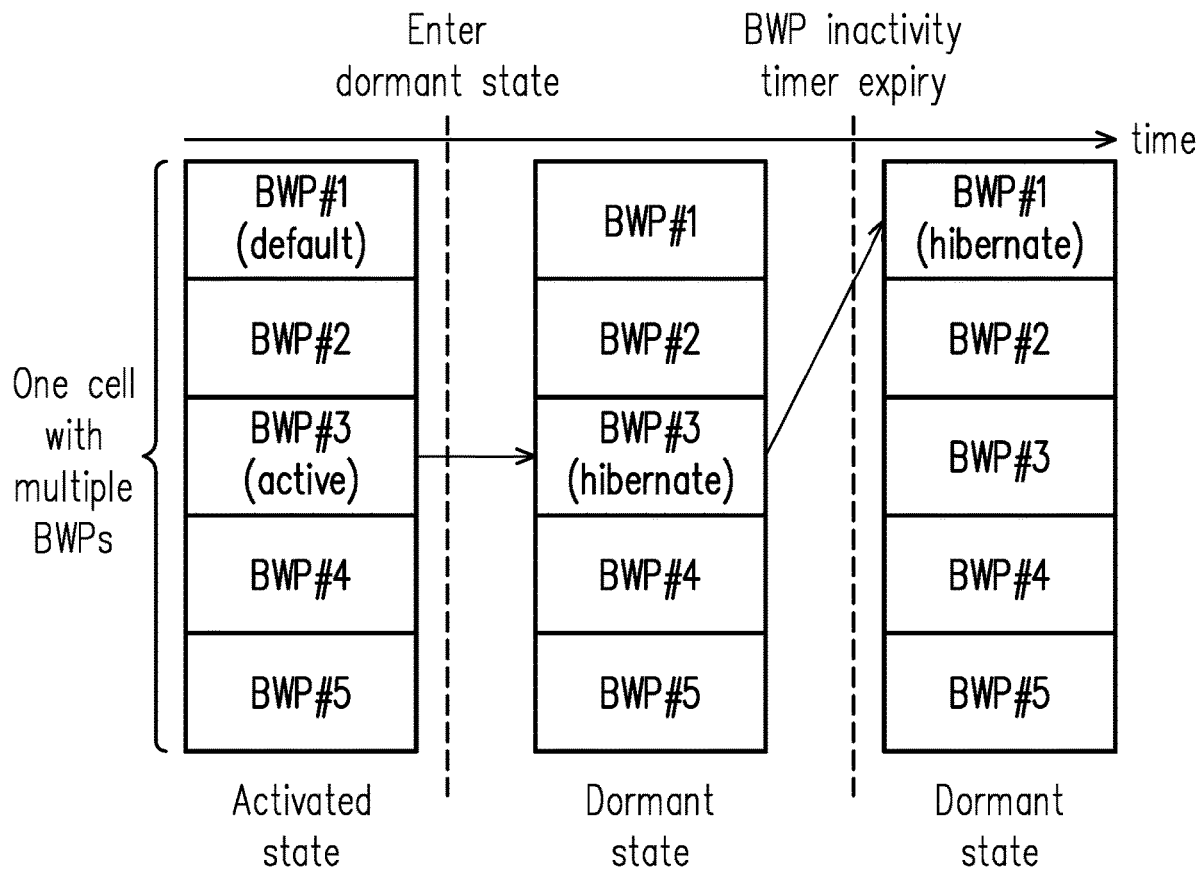
FIG. 8 is a schematic diagram of operation of BWP inactivity timer upon the SCell entering the dormant state according to another embodiment of the disclosure.

In an embodiment, if the UE stays at the same BWP upon entering the dormant state and the said BWP is not a specific BWP such as a default BWP, a timer such as a BWP inactivity timer may keep running. FIG. 8 is a schematic diagram of operation of BWP inactivity timer upon the SCell entering the dormant state according to another embodiment of the disclosure. The UE may determine hibernate in BWP #3 upon entering the dormant state, wherein BWP #3 is the same BWP the UE staying in before the SCell entering the dormant state. The BWP inactivity timer may keep running upon the SCell entering the dormant state if the current BWP (i.e., BWP #3) is not a default BWP. Then, the UE may switch from BWP #3 to a default BWP (i.e., BWP #1) in response to the BWP inactivity timer expiry, or the UE may switch from BWP #3 to another BWP in response to leaving the dormant state or receiving a further indication. In an embodiment, the BWP inactivity timer may be ignored by the UE. That is, the UE may determine to switch to or stay in a BWP without a considering the BWP inactivity timer.

Figure 9:
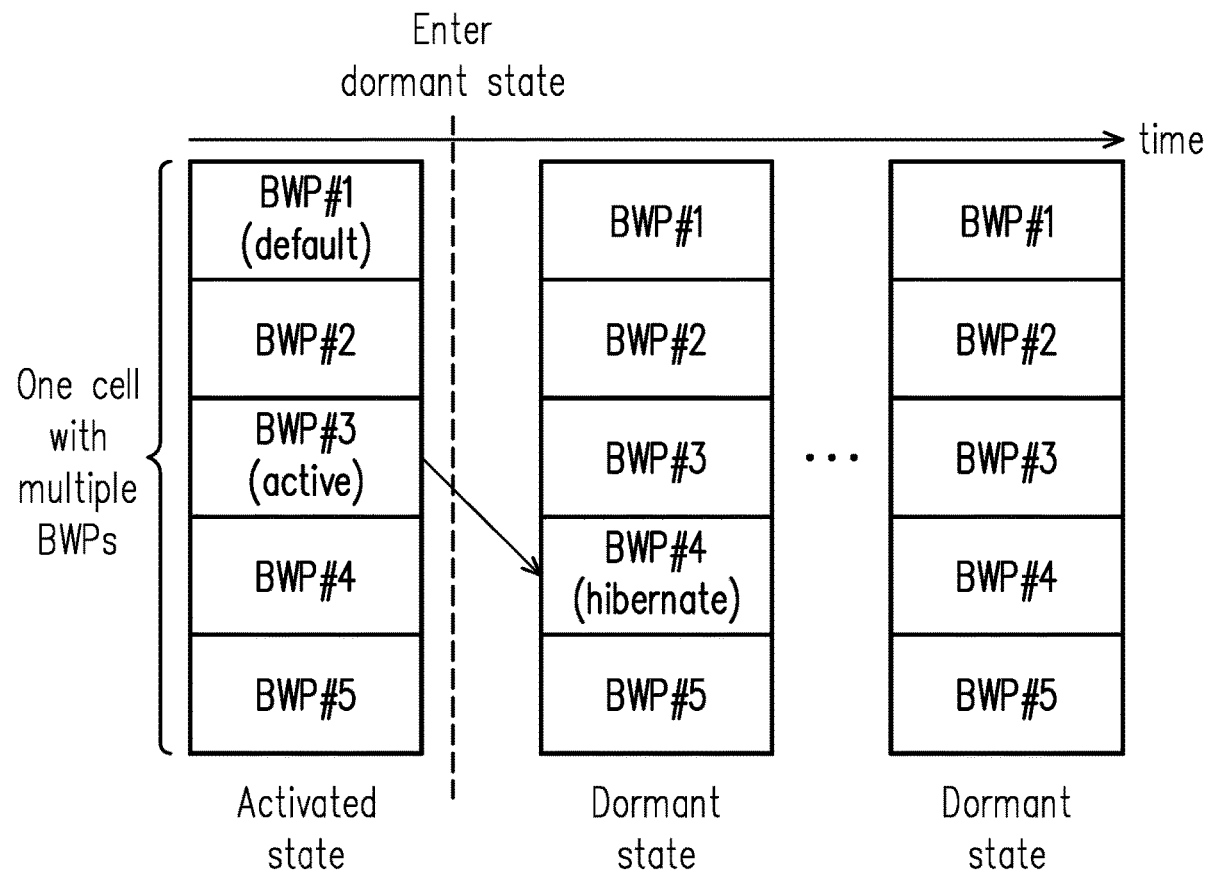
FIG. 9 is a schematic diagram of BWP operation for the UE upon the SCell entering the dormant state according to the other embodiment of the disclosure.

FIG. 9 is a schematic diagram of BWP operation for the UE upon the SCell entering the dormant state according to the other embodiment of the disclosure. The UE may receive a signaling such as a higher layer signaling (e.g., a RRC message or a MAC CE (e.g., hibernation MAC CE)) or a physical layer signaling (e.g., a downlink control information (DCI)). The signaling may indicate the UE a pre-configured BWP (i.e., BWP #4) by a BWP ID associated with the SCell ID. The UE may switch from the current BWP to the pre-configured BWP according to the indication upon entering to the dormant state. For example, the UE may switch from BWP #3 (i.e., active BWP) to BWP #4 upon entering the dormant state.

Figure 10:
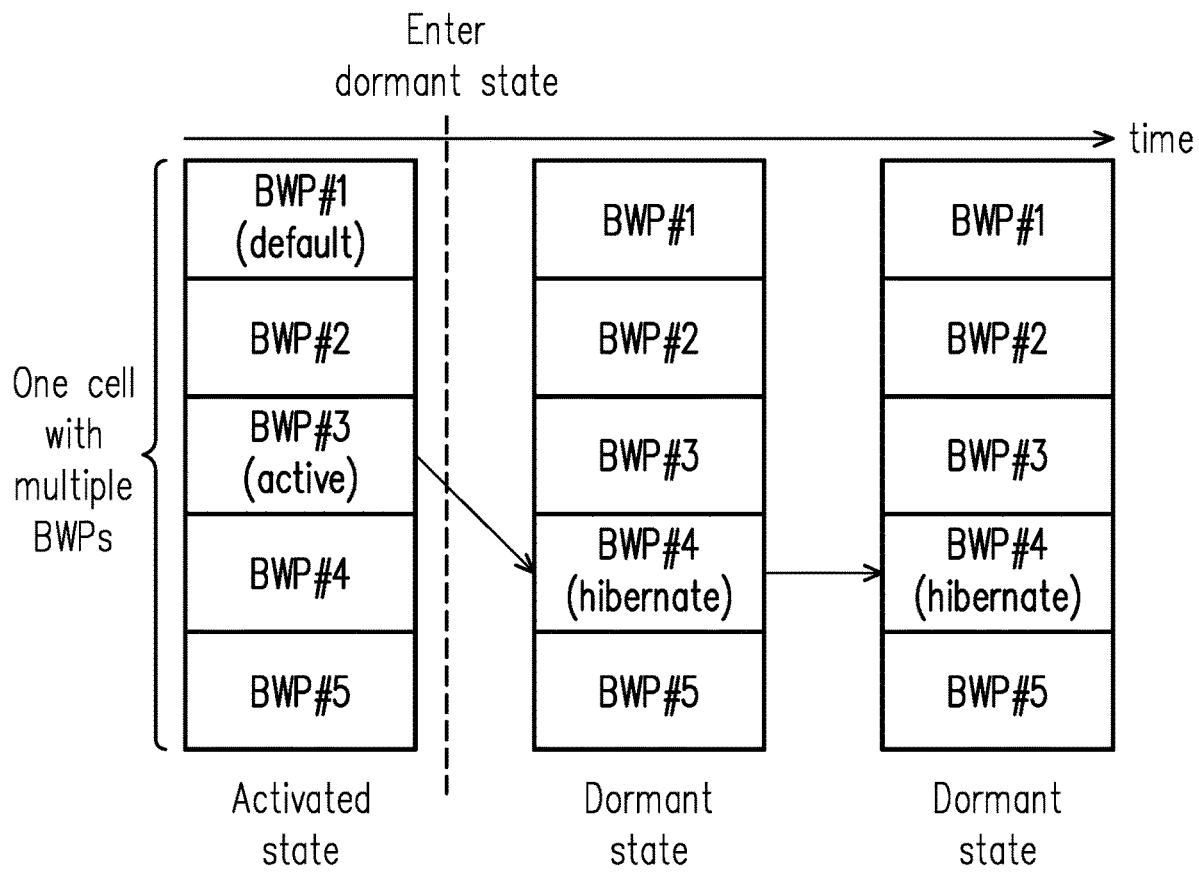
FIG. 10 is a schematic diagram of operation of BWP inactivity timer upon the UE switching to a pre-configured BWP according to an embodiment of the disclosure.

If the active BWP which the UE stays in before the SCell entering the dormant state is not a specific BWP such as a default BWP, a timer such as a BWP inactivity timer of the SCell (or the UE) may be configured to run during the activated state. In an embodiment, if the UE switch to a pre-configured BWP upon entering the dormant state and the pre-configured BWP is not a default BWP, the UE may determine not to switch to another BWP upon the SCell entering the dormant state, and the BWP inactivity timer may stop or suspend upon the SCell entering the dormant state. FIG. 10 is a schematic diagram of operation of BWP inactivity timer upon the UE switching to a pre-configured BWP according to an embodiment of the disclosure. A timer such as a BWP inactivity timer may stop or suspend upon the SCell entering the dormant state or the UE switching to the pre-configured BWP (i.e., BWP #4 or a dormant BWP). The UE may hibernate in BWP #4 which is the same BWP the UE staying in before the SCell entering the dormant state.

The UE may hibernate in BWP #4 until leaving the dormant state or receiving further indication from the base station. In an embodiment, while the UE hibernating in BWP #4, a signaling indicating the UE to stay in a dormant BWP may be received by the UE. Since BWP #4 is already a dormant BWP, the UE may not switch to another BWP in response to receiving the signaling.

Figure 11:
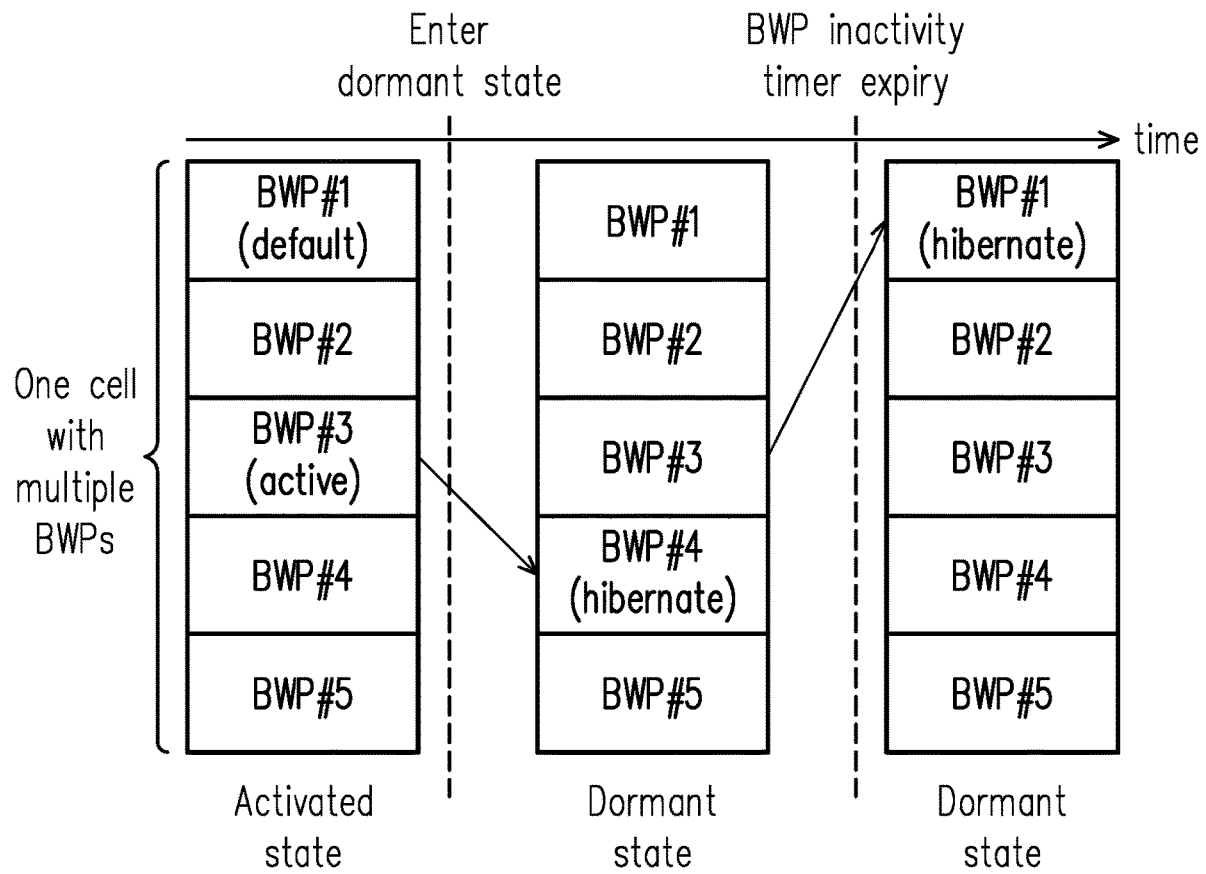
FIG. 11 is a schematic diagram of operation of BWP inactivity timer upon the UE switching to a pre-configured BWP according to another embodiment of the disclosure.

If the active BWP which the UE stays in before the SCell entering the dormant state is not a specific BWP such as a default BWP, a timer such as a BWP inactivity timer of the SCell (or the UE) may be configured to run. In an embodiment, if the UE switch to a pre-configured BWP upon entering the dormant state and the pre-configured BWP is not a default BWP, the BWP inactivity timer may keep running. FIG. 11 is a schematic diagram of operation of BWP inactivity timer upon the UE switching to a pre-configured BWP according to another embodiment of the disclosure. The BWP inactivity timer may keep running upon the UE entering the dormant state and switching to the pre-configured BWP (i.e., BWP #4). The UE may hibernate in BWP #4, then the UE may switch to a default BWP (i.e., BWP #1) after the BWP inactivity timer expiry. The UE may hibernate in the default BWP until leaving the dormant state or receiving further indication from the base station. In an embodiment, the BWP inactivity timer may be ignored by the UE. That is, the UE may determine to switch to or stay in in a BWP without considering the BWP inactivity timer.

Figure 12:
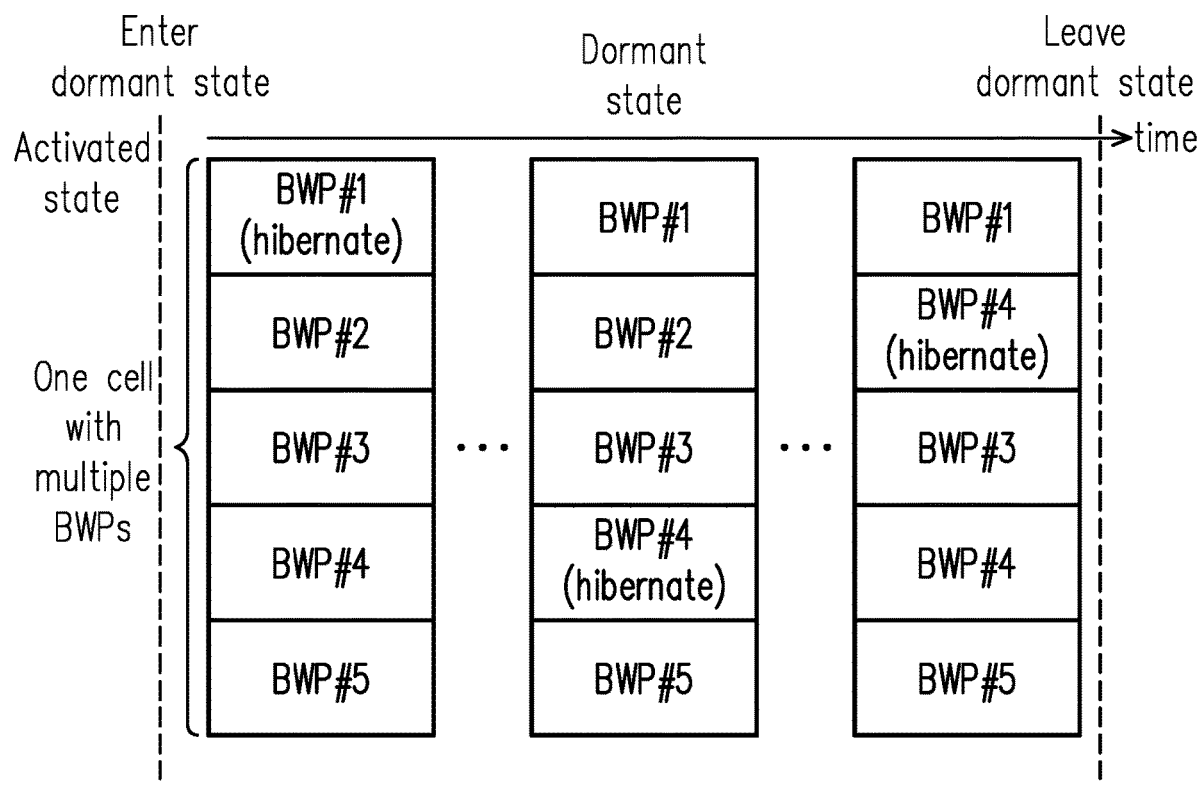
FIG. 12 is a schematic diagram of performing CSI measurement during the dormant state according to an embodiment of the disclosure.

FIG. 12 is a schematic diagram of performing CSI measurement during the dormant state according to an embodiment of the disclosure. The UE may receive an indication (e.g., explicit indication or implicit indication) including a CSI configuration or a BWP hopping pattern, and determine said BWP according to the received indication.

After determining the BWP, the UE may hibernate in the BWP and perform CSI measurement or feedback a CSI report to the base station on the BWP, wherein the CSI measurement or the CSI report feedback may be performed according to the CSI configuration or the BWP hopping pattern. The CSI report may include, for example, a channel quality index (CQI), a precoding matrix indicator (PMI), a rank indication (RI), a precoding type indicator (PTI), or a CSI reference signal resource indicator (CRI), but the disclosure is not limited thereto.

Figure 13:
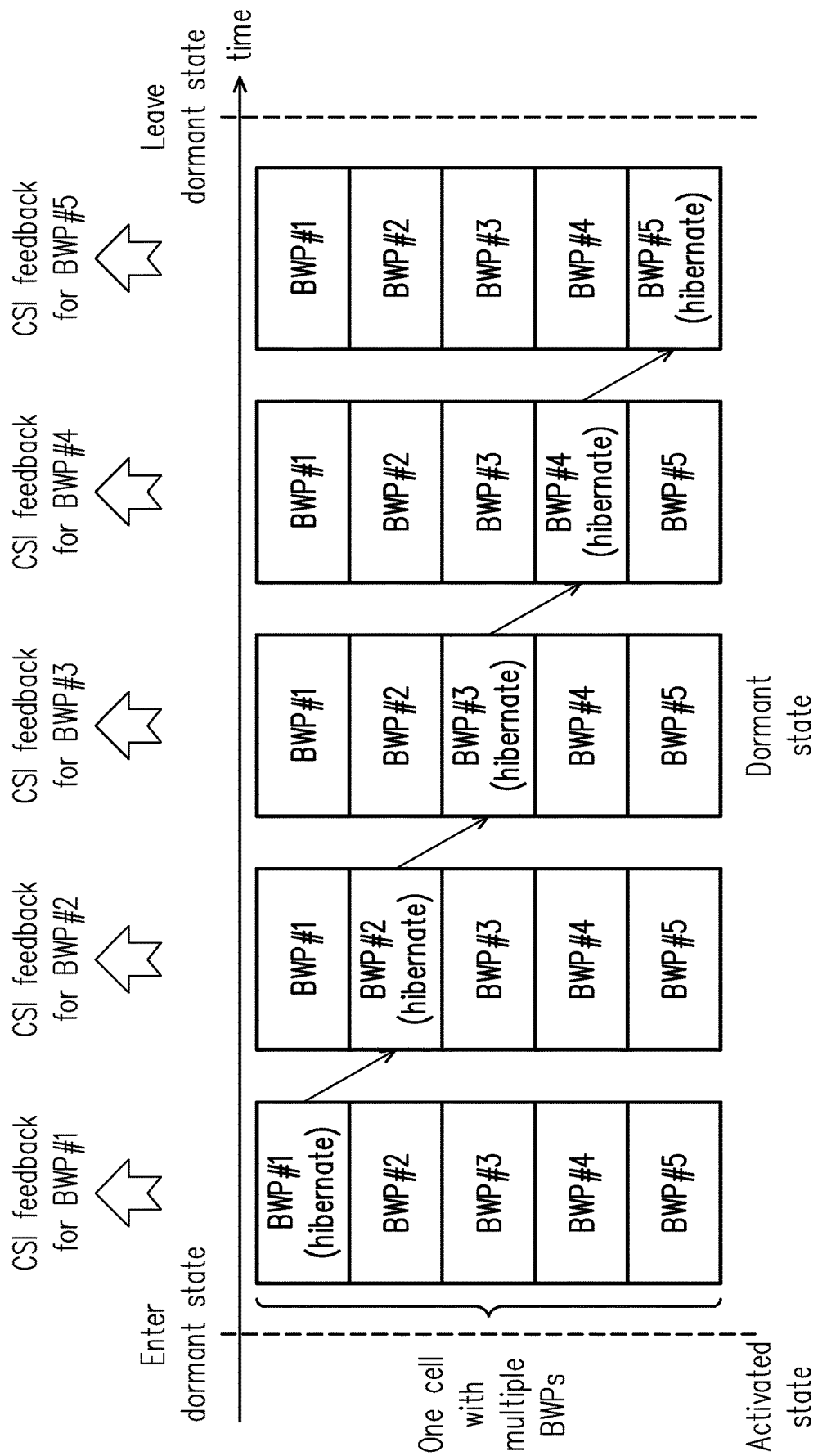
FIG. 13 is a schematic diagram of performing CSI measurement based on a BWP hopping pattern according to an embodiment of the disclosure.

The UE may determine a BWP to hibernate in according to a BWP hopping pattern during the dormant state. FIG. 13 is a schematic diagram of performing CSI measurement based on a BWP hopping pattern according to an embodiment of the disclosure. The BWP hopping pattern corresponding to one or more BWPs may be indicated to the UE via a signaling such as a MAC CE or a DCI (e.g., one or more bits). In an embodiment, a plurality of BWP hopping patterns may be pre-configured to the UE. The UE may select a BWP hopping pattern from the plurality of BWP hopping patterns according to the MAC CE or DCI.

The BWP hopping pattern may include pre-configured hopping rule such as a BWP switching sequence. The UE may switch from a current BWP to another BWP according to the BWP switching sequence during the dormant state. For example, the UE may switch to BWP #1, BWP #2, BWP #3, BWP #4, and BWP #5 sequentially according to the BWP hopping rule, and may receive a CSI-RS, perform CSI measurement, or feedback CSI report while staying in each of the BWP, wherein each of the BWPs may be configured with one or more CSI resources (e.g., time or frequency resources). The UE may apply the BWP hopping pattern in response to, for example, a transition to a dormant state, an expiry of a BWP inactivity timer, a stopping of a BWP inactivity timer, a starting of a pre-configured timer, an expiry of a pre-configured timer, or a reception of an triggering indication (e.g., form PCell or SpCell), but the disclosure is not limited thereto. The BWP hopping pattern may be associated with a CSI resource configuration, a CSI report configuration (e.g., per cell or per BWP), a BWP ID, or a CORESET ID. The UE may provide a CSI feedback to the gNB via the PCell or the SpCell according to the CSI report configuration.

In an embodiment, a hopping timer may be configured for a BWP hopping pattern. The hopping timer may start in response to the UE being able to receive CSI-RS or perform CSI measurement. The hopping timer may re-start upon the UE receiving a gNB indication (e.g., via a RRC message, a MAC CE, or a DCI). The UE may perform CSI measurement for a hibernate BWP if the hopping timer is running. The UE may perform BWP switching according to a BWP hopping pattern (e.g., based on a BWP ID or pre-configuration), a gNB indication (e.g., via a RRC message, a MAC CE, or a DCI), or a UE preference (e.g., switching to a random BWP) upon the hopping timer expiry. The hopping timer may be associated with system frame number or system frame slot.

Figure 14:
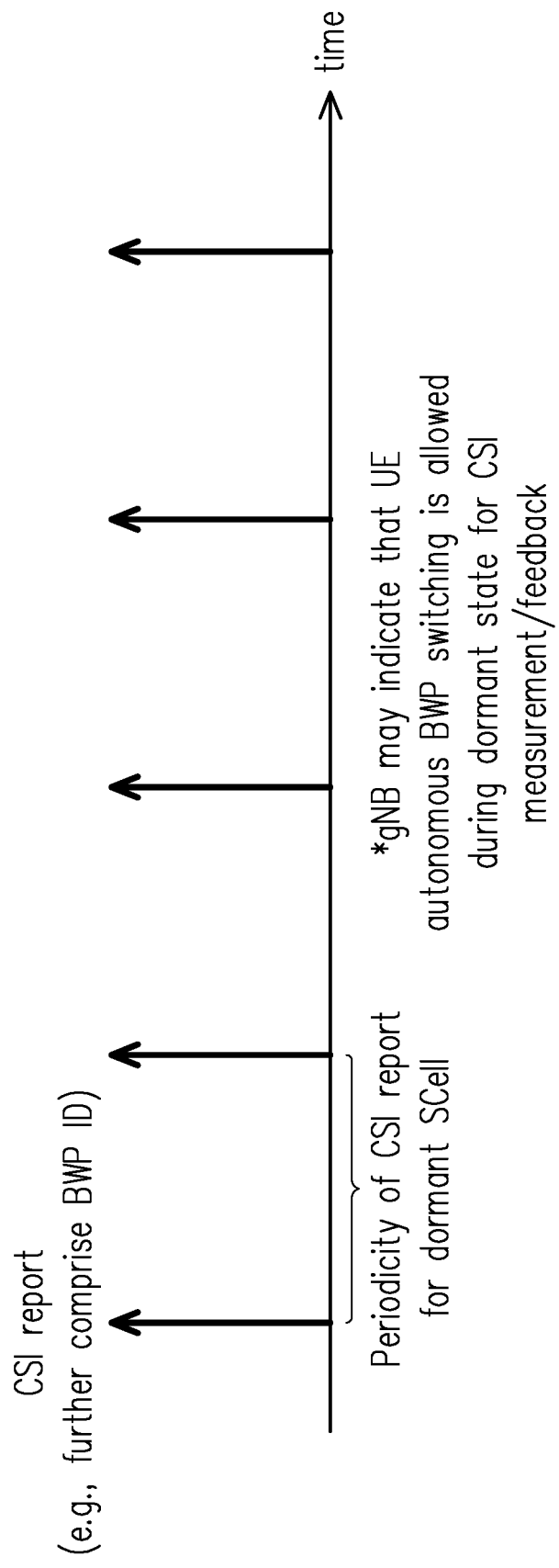
FIG. 14 is a schematic diagram of performing CSI measurement based on a decision of the UE according to an embodiment of the disclosure.

The UE may determine a BWP to hibernate in according to its own decision. FIG. 14 is a schematic diagram of performing CSI measurement based on a decision of the UE according to an embodiment of the disclosure. The UE may be configured with CSI resource (e.g., time or frequency resource) per BWP, and may be configured with a CSI report configuration. The UE may feedback CSI report according to the CSI report configuration via the CSI resource. For example, the CSI report configuration may indicate the UE to feedback CSI report via periodic and/or physical resource. The CSI report configuration may be further re-configurated by the PCell. The UE may perform CSI measurement or feedback CSI report based on an indication or a user preference. The UE may determine whether to switch from the current BWP to another BWP according to the user preference. For example, in order to save power, the UE may determine to switch to a BWP with lesser bandwidth to hibernate. In some embodiment, a CSI report feedback from the UE to the base station (e.g., gNB) may include a BWP ID or a CSI-ResourceConfigId message. The base station may identify which BWP the UE perform CSI measurement for according to the BWP ID. The CSI-ResourceConfigId message may include an ID corresponding to a CSI resource configuration which may be associated with a BWP and/or a cell. For example, the CSI resource configuration may indicate the UE to feedback a CSI report including a BWP ID and/or a cell ID.

Figure 15:
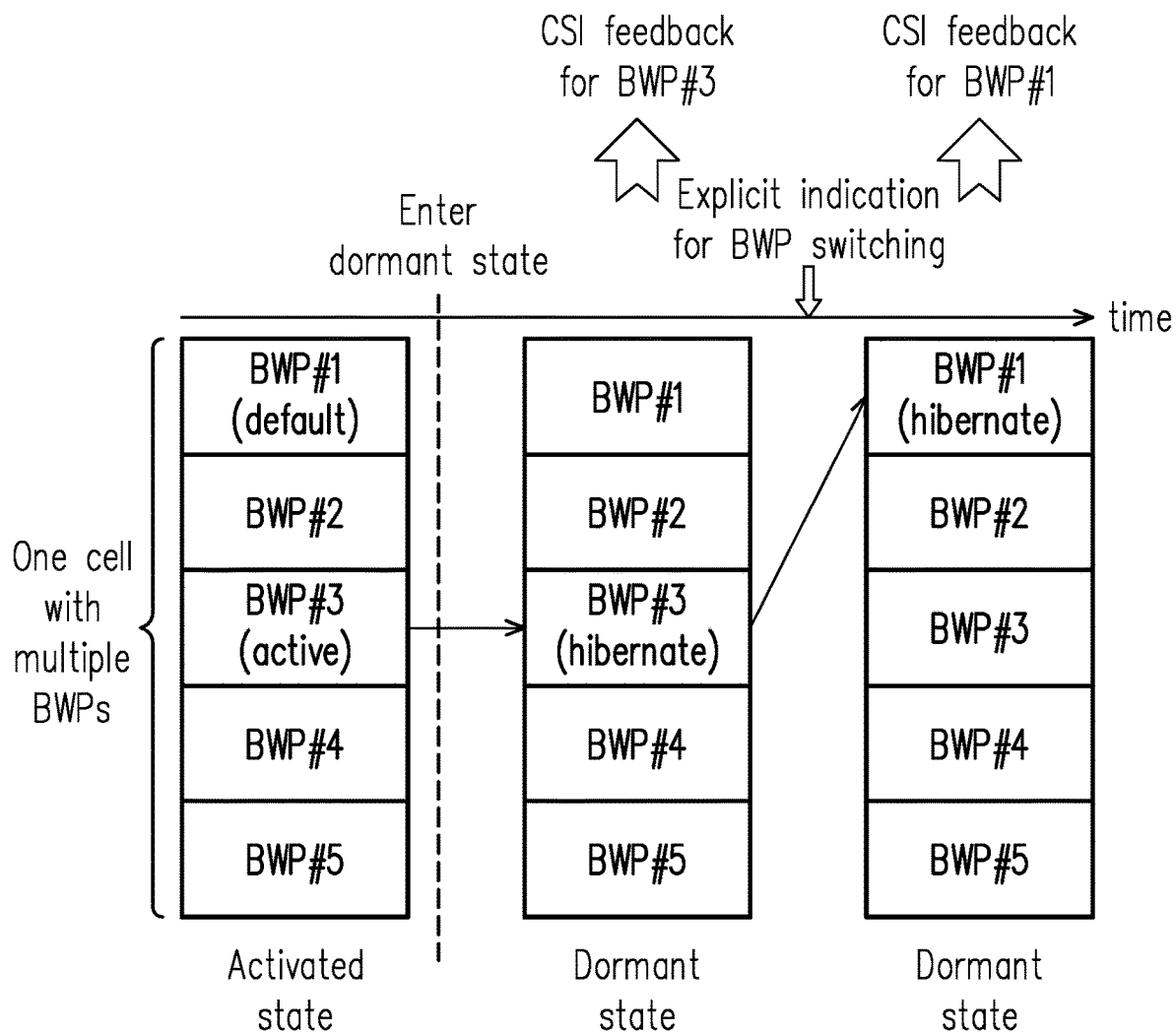
FIG. 15 is a schematic diagram of performing CSI measurement based on an indication according to an embodiment of the disclosure.

The UE may determine a BWP to hibernate in according to an explicit indication during the dormant state. FIG. 15 is a schematic diagram of performing CSI measurement based on an explicit indication according to an embodiment of the disclosure. The base station may determine a BWP of the SCell for the UE to perform BWP switching/adaption, and may transmit an explicit indication comprising information of the BWP to the UE, wherein the BWP may be determined according to traffic characteristic, service type, load balance, data volume, channel quality, or CSI acquisition, but the disclosure is not limited thereto. For example, the base station may be aware of a channel quality of a BWP of a SCell is under a quality level, and may indicate the UE to perform CSI measurement/feedback for the BWP by transmitting the explicit indication. The explicit indication may include a BWP ID associated with a SCell (or a SCell ID). The UE may determine the BWP to hibernate in according to the BWP ID. For example, the UE may switch from BWP #3 to BWP #1 in response to receiving an explicit indication which includes a BWP ID of BWP #1.

The explicit indication may be transmitted to the UE via a higher layer signaling (e.g., a RRC message or a MAC CE (e.g., hibernation MAC CE)) or a physical layer signaling (e.g., a downlink control information (DCI)). For example, a RRC message received by the UE may include a SCell ID, a dormant BWP ID, and a CSI configuration. The UE may determine to switch to a BWP corresponding to the dormant BWP ID for CSI measurement or CSI feedback. The CSI configuration may include a CQI-ReportPeriodic message which may be associated with a periodic reporting configuration or a channel quality index (CQI) format indicator, wherein the periodic reporting configuration may indicate a time interval for the UE to feedback CSI report to the base station. For another example, a MAC CE received by the UE may include a SCell ID field and a BWP ID field, as shown in table 1.

TABLE 1

| $C_7$ | $C_6$ | $C_5$ | $C_4$ | $C_3$ | $C_2$ | $C_1$ | $C_0$ |
|---|---|---|---|---|---|---|---|
| $B_7$ | $B_6$ | $B_5$ | $B_4$ | $B_3$ | $B_2$ | $B_1$ | $B_0$ |

The SCell field may include byte $C_0$, $C_1$, $C_2$, $C_3$, $C_4$, $C_5$, $C_6$, and $C_7$ which respectively indicate the dormant/activated status of the SCells with index 0, 1, 2, 3, 4, 5, 6, and 7. For example, byte $C_1$=0 may indicate that the SCell with index 1 (i.e., SCell ID=1) is in the dormant state, and $C_1$=1 may indicate that the SCell with index 1 is in the activated state. In an embodiment, SCell (e.g., SCell with index 1) may be configured with 4 BWPs. The BWP ID field may include byte $B_0$, $B_1$, $B_2$, and $B_3$ corresponding to SCell with index 1, wherein byte $B_0$, $B_1$, $B_2$, and $B_3$ may respectively indicate the dormant status of the BWPs with BWP index 0, 1, 2, and 3. For example, byte $B_0$=1 may indicate that the BWP with index 0 (i.e., BWP ID=0) is in the dormant state. Furthermore, another SCell (e.g., SCell with index 2) may be configured with 4 BWPs. The BWP ID field may include byte $B_4$, $B_5$, $B_6$, and $B_7$ corresponding to SCell with SCell index 2, wherein byte $B_4$, $B_5$, $B_6$, and $B_7$ may respectively indicate the dormant status of the BWPs with BWP index 4, 5, 6, and 7. For example, byte $B_4$=1 may indicate that the BWP with index 4 (i.e., BWP ID=4) is in the dormant state.

Figure 16:
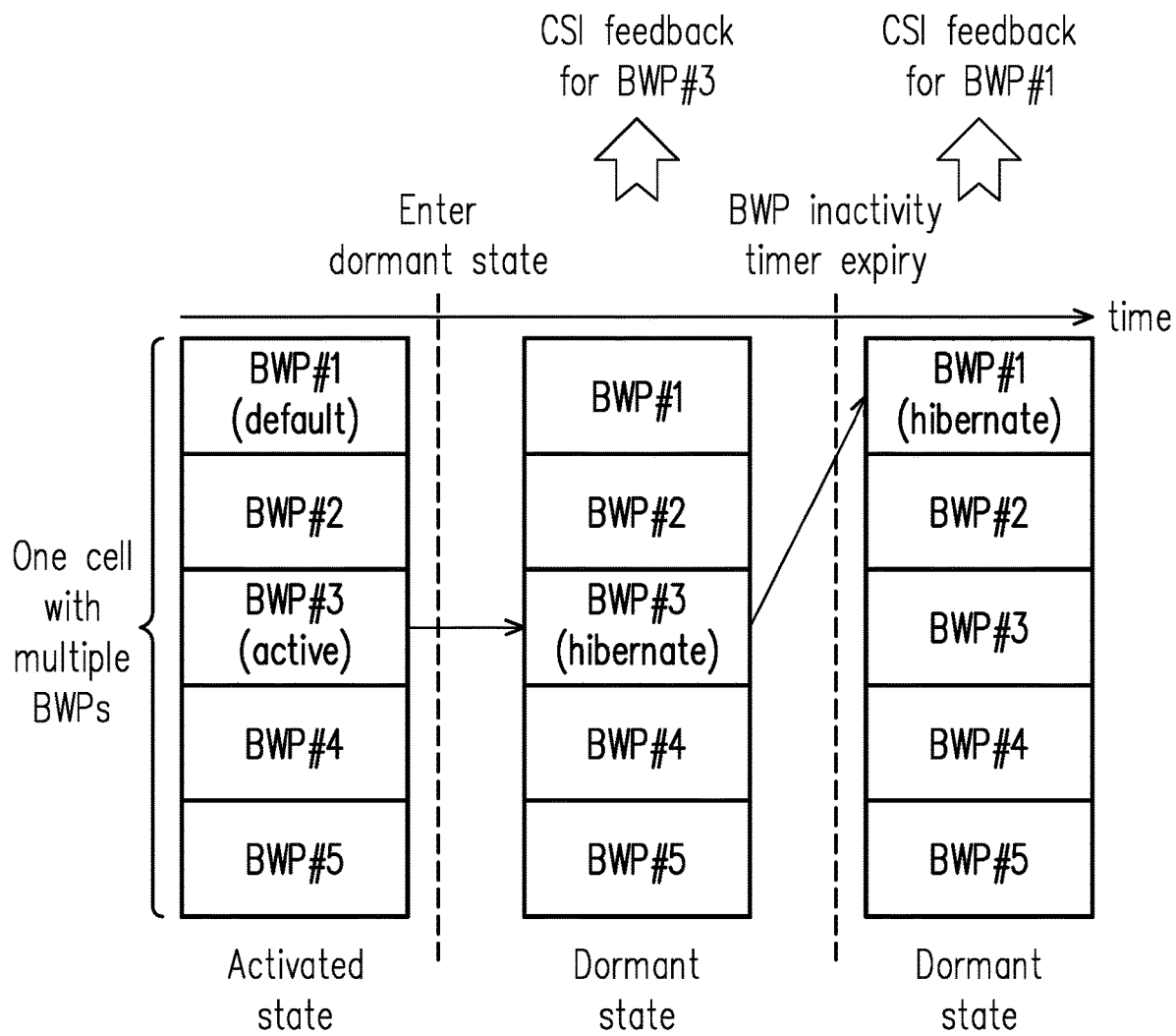
FIG. 16 is a schematic diagram of performing CSI measurement based on BWP inactivity timer according to an embodiment of the disclosure.

The UE may determine a BWP to hibernate in according to a BWP inactivity timer during the dormant state. FIG. 16 is a schematic diagram of performing CSI measurement based on BWP inactivity timer according to an embodiment of the disclosure. A timer such as a BWP inactivity timer initialed before the UE entering the dormant state may keep running upon the UE entering the dormant state. In response to the BWP inactivity timer expiry, the UE may switch to a specific BWP such as a default BWP. Referring to FIG. 16, the UE may stay in BWP #3 (e.g., active BWP) upon entering the dormant stat and may perform CSI measurement or feedback CSI report for BWP #3. In response to the BWP inactivity timer expiry, the UE may switch from BWP #3 to BWP #1 (e.g., default BWP) and may perform CSI measurement or feedback CSI report for BWP #1. In an embodiment, the UE may not switch to BWP #1 in response to the BWP inactivity timer expiry, even if BWP #1 (e.g., default BWP) is not a dormant BWP. That is, the BWP inactivity timer may not be used for state transition (or BWP switching) if the default BWP is not a dormant BWP.

Figure 17:
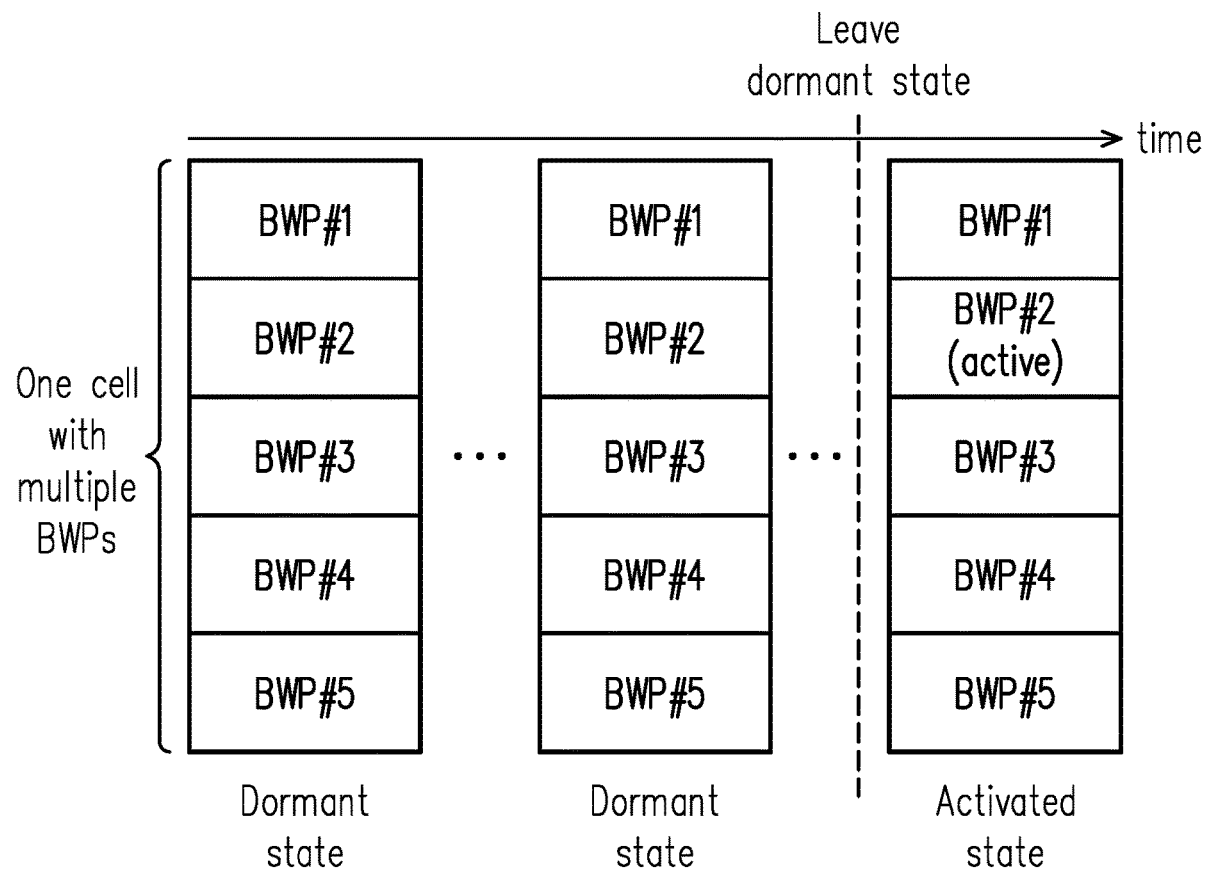
FIG. 17 is a schematic diagram of BWP operation for the UE upon the SCell leaving the dormant state based on an explicit indication according to an embodiment of the disclosure.

The UE may determine to switch from a dormant BWP to an active BWP (or wake-up BWP) according to an explicit indication. FIG. 17 is a schematic diagram of BWP operation for the UE upon the SCell leaving the dormant state based on an explicit indication according to an embodiment of the disclosure. The UE may be configured, by a signaling, to leave the dormant state and enter the activated state, wherein the signaling may be pre-configured to the UE or be dynamic indicated to the UE. The signaling may comprise an ID of a SCell, a SCell state (e.g., dormant, activated, or de-activated state), or an ID of a wake-up BWP. The signaling may indicate a wake-up BWP (or non-dormant BWP). The UE may determine a wake-up BWP from a plurality of BWPs according to the signaling. The UE may switch from the dormant BWP to the wake-up BWP upon leaving the dormant state.

The signaling may be a higher layer signaling (e.g., a RRC message or a MAC CE (e.g., hibernation MAC CE)) or a physical layer signaling (e.g., a downlink control information (DCI)) from PCell or SpCell. In an embodiment, the signaling is a RRC message and the signaling may indicate an ID of a SCell, an ID of a first dormant BWP, an ID of a wake-up BWP, a BWP hopping pattern, or a CSI configuration. In another embodiment, the signaling is a MAC CE and the signaling may indicate a dormant/activated status of a SCell with a SCell index, may indicate a dormant status of a BWP with a BWP ID, or may indicate an activated status of a BWP with a BWP ID. In an embodiment, a MAC CE may correspond to a SCell configured with 4 BWPs, as shown in table 2, wherein byte $C_0$, $C_1$, $C_2$, and $C_3$ may respectively indicate the dormant status of the BWPs with BWP ID 0, 1, 2, and 3, and byte $C_4$, $C_5$, $C_6$, and $C_7$ may respectively indicate the activated status of the BWPs with BWP ID 0, 1, 2, and 3. For example, byte $C_0$ may be set to "1" to indicate that the BWP with BWP ID 0 is the first dormant BWP upon the UE entering the dormant state. Byte $C_4$ may be set to "1" to indicate that the BWP with BWP ID 0 is the wake-up BWP upon the UE leaving the dormant state and entering the activated state.

TABLE 2

| $C_7$ | $C_6$ | $C_5$ | $C_4$ | $C_3$ | $C_2$ | $C_1$ | $C_0$ |
|---|---|---|---|---|---|---|---|

Figure 18:
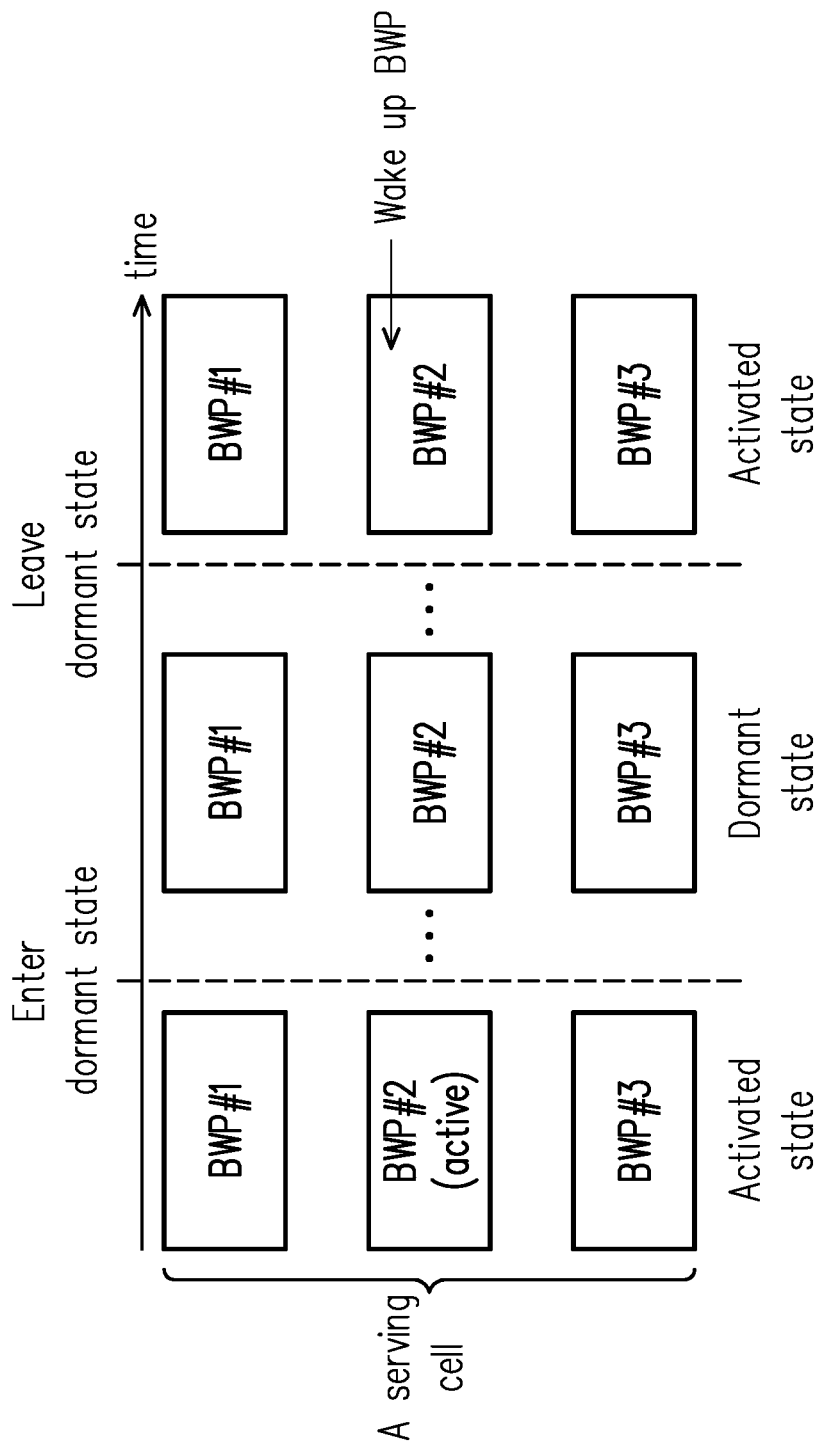
FIG. 18 is a schematic diagram of BWP operation for the UE upon the SCell leaving the dormant state based on an implicit indication according to an embodiment of the disclosure.

The UE may determine to switch from a dormant BWP to an active BWP (or wake-up BWP) according to an implicit indication. In an embodiment, the UE may determine to switch, upon leaving the dormant state, to a BWP which is the same as the BWP the UE staying in before entering the dormant state according to a BWP ID of the BWP. FIG. 18 is a schematic diagram of BWP operation for the UE upon the SCell leaving the dormant state based on an implicit indication according to an embodiment of the disclosure. Referring to FIG. 18, the UE may stay in BWP #2 before entering the dormant state, and may switch back to BWP #2 upon leaving the dormant state.

In an embodiment, the UE may determine to switch, upon leaving the dormant state, to a BWP corresponding to a first active BWP (e.g., firstActiveDownlinkBWP or firstActiveUplinkBWP), an initial BWP, or a default BWP configured by a signaling such as a RRC message.

In an embodiment, the UE may determine to switch, upon leaving the dormant state, to a BWP based on a BWP hopping pattern. For example, the UE may apply the BWP hopping pattern upon leaving the dormant state. The UE may switch to a BWP corresponding to the BWP hopping pattern in response to applying the BWP hopping pattern.

In an embodiment, the UE may determine to switch, upon leaving the dormant state, to a BWP based on a subcarrier spacing. For example, the UE may switch to a BWP corresponding to a largest or smallest subcarrier spacing.

Figure 19:
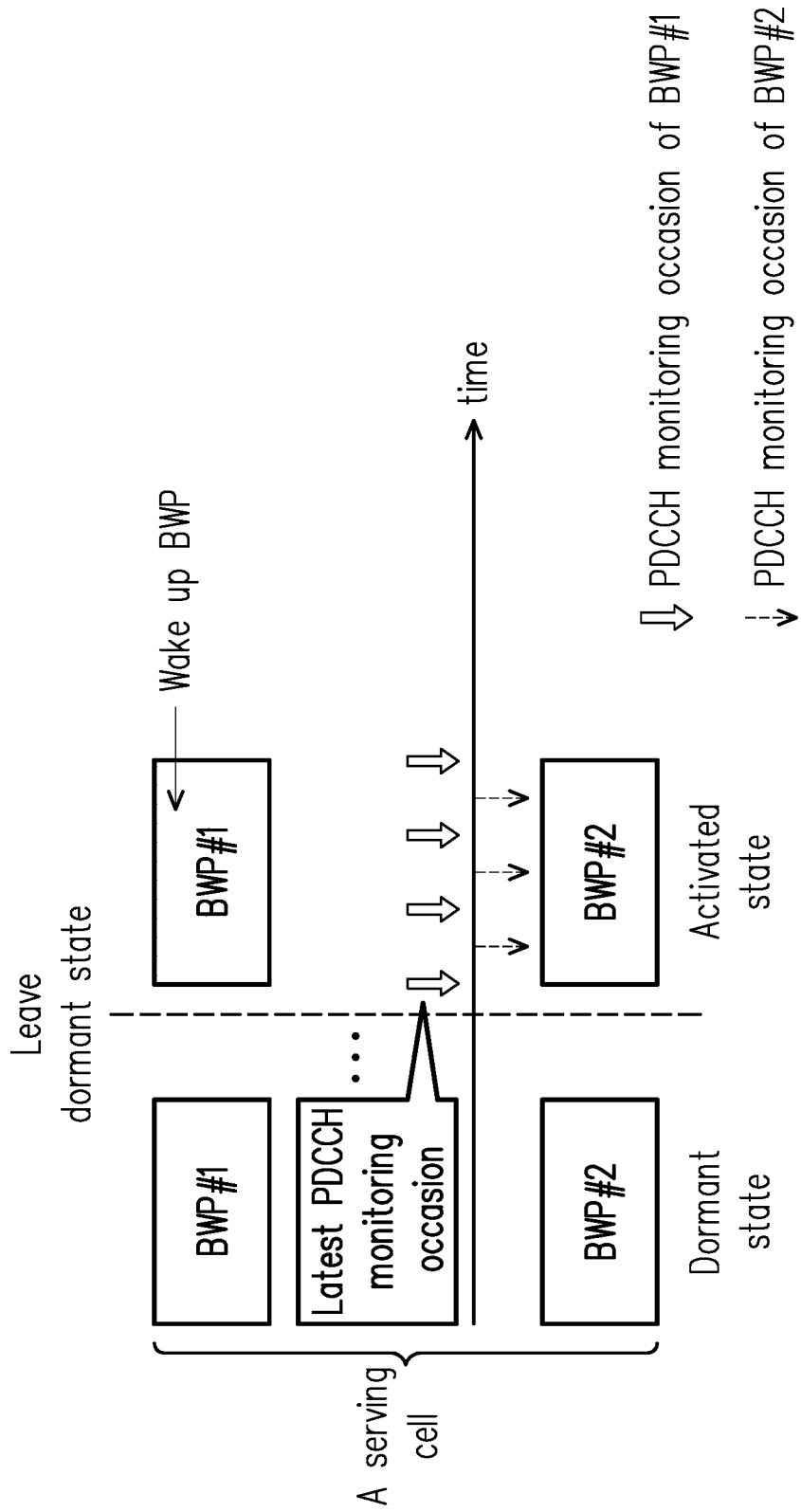
FIG. 19 is a schematic diagram of BWP operation for the UE upon the SCell leaving the dormant state based on a PDCCH monitoring occasion according to an embodiment of the disclosure.

In an embodiment, the UE may determine to switch, upon leaving the dormant state, to a BWP based on a BWP ID corresponding to a latest CSI report or a latest PDCCH monitoring occasion. For example, the UE may switch, upon leaving the dormant state, to a BWP with a lowest or highest BWP ID. FIG. 19 is a schematic diagram of BWP operation for the UE upon the SCell leaving the dormant state based on a PDCCH monitoring occasion according to an embodiment of the disclosure. If a serving cell enters the activated state from the dormant state, the UE served by the serving cell may choose, from multiple BWPs, a BWP as the wake-up BWP according to the latest PDCCH monitoring occasion. Specifically, each of the BWPs of the serving cell may be configured with at least one PDCCH monitoring occasion. If a specific BWP is configured with a PDCCH monitoring occasion which is the latest PDCCH monitoring occasion after the serving cell leaving the dormant state, the UE may choose the specific BWP as the wake-up BWP. Referring to FIG. 19, since the latest PDCCH monitoring occasion after the serving cell leaving the dormant state is corresponded to BWP #1, the UE may choose BWP #1 as the wake-up BWP. In other words, after the serving cell leaving the dormant state, if the first PDCCH monitoring occasion the UE meets is corresponded to BWP #1, the UE may thus choose BWP #1 as the wake-up BWP.

Figure 20:
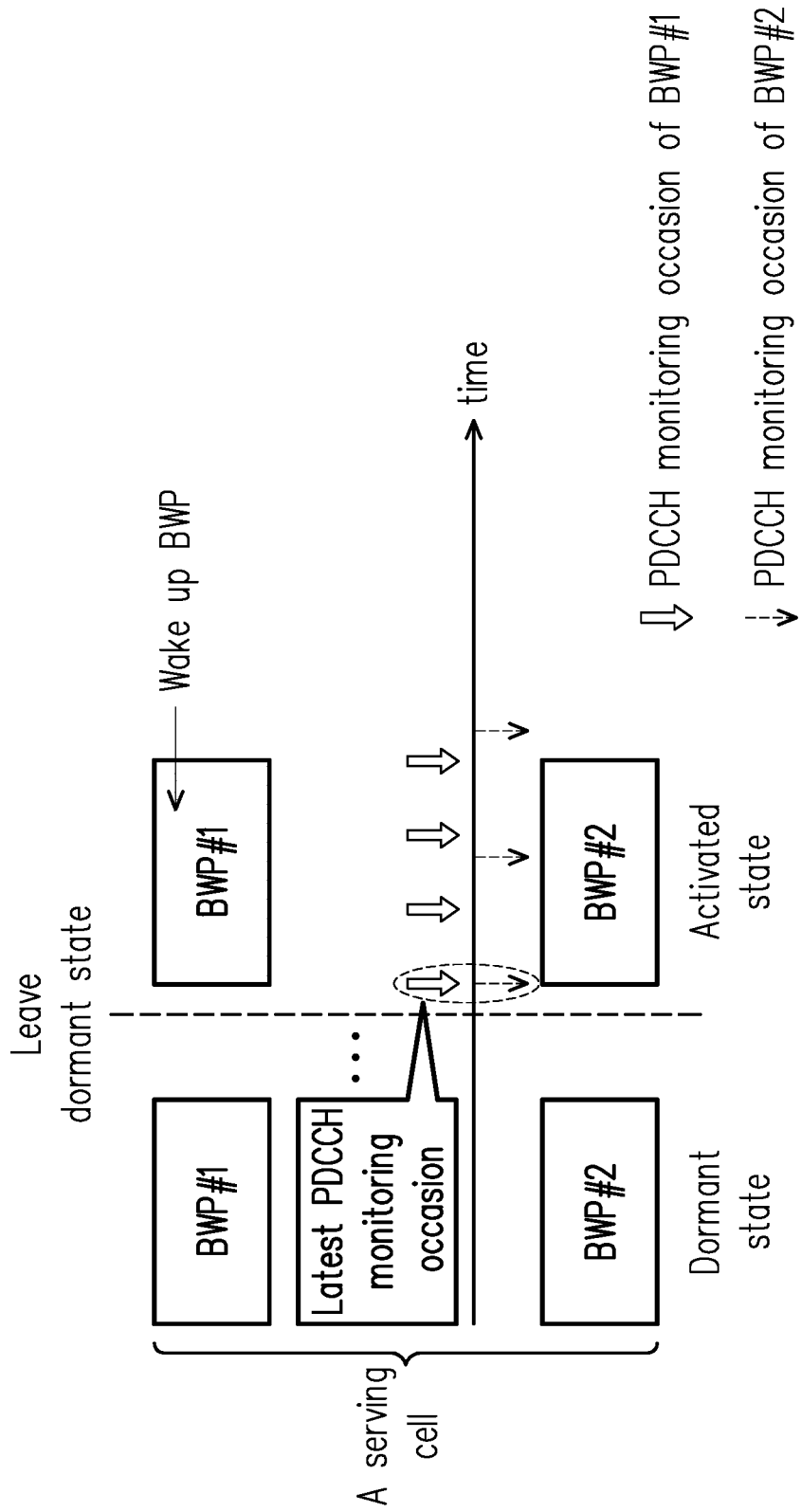
FIG. 20 is a schematic diagram of BWP operation for the UE upon the SCell leaving the dormant state based on a PDCCH monitoring occasion and a BWP ID according to an embodiment of the disclosure.

FIG. 20 is a schematic diagram of BWP operation for the UE upon the SCell leaving the dormant state based on a PDCCH monitoring occasion and a BWP ID according to an embodiment of the disclosure. If the latest PDCCH monitoring occasion after the serving cell leaving the dormant state is corresponded to multiple BWPs, the UE may choose a wake-up BWP from the multiple BWPs according to a BWP ID. The UE may choose a BWP with the highest or lowest BWP ID as the wake-up BWP. For example, referring to FIG. 20, the latest PDCCH monitoring occasion after the serving cell leaving the dormant state is corresponded to both BWP #1 and BWP #2. That is, the latest PDCCH monitoring occasion of BWP #1 may overlap with the latest PDCCH monitoring occasion of BWP #2 in time. The UE may choose BWP #1 instead of BWP #2 as the wake-up BWP in response to BWP #1 having the lowest BWP ID or in response to the BWP ID of BWP #1 is lower than the BWP ID of BWP #2.

Figure 21:
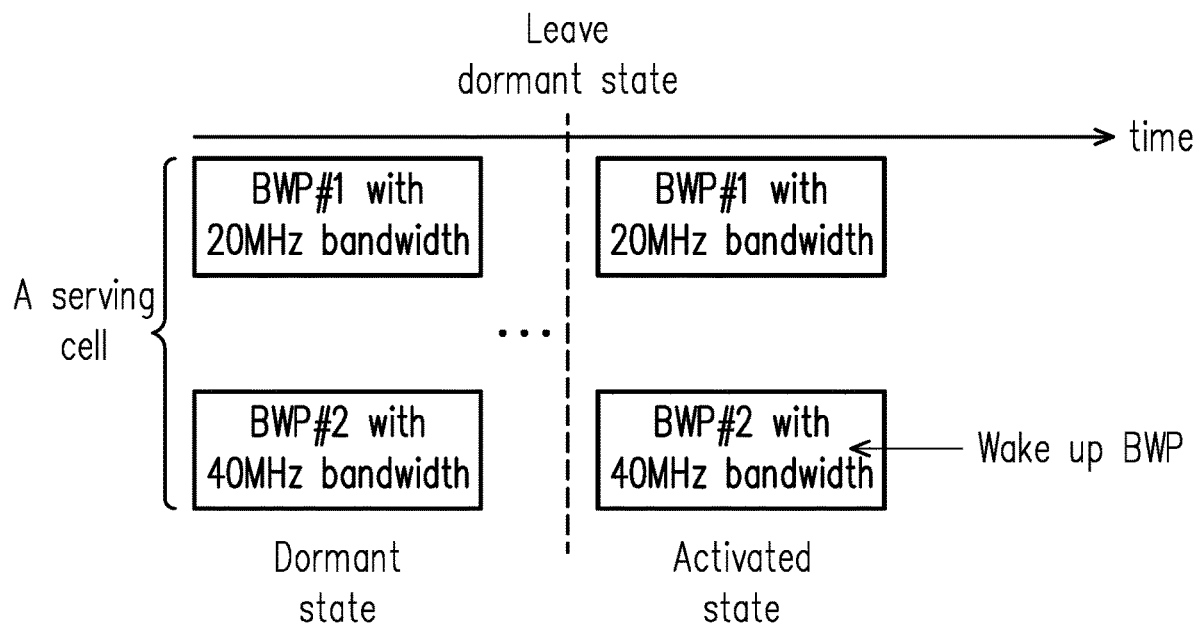
FIG. 21 is a schematic diagram of BWP operation for the UE upon the SCell leaving the dormant state based on a bandwidth of a BWP according to an embodiment of the disclosure.

FIG. 21 is a schematic diagram of BWP operation for the UE upon the SCell leaving the dormant state based on a bandwidth of a BWP according to an embodiment of the disclosure. The UE may switch, upon leaving the dormant state, to a BWP based on a bandwidth of the BWP. For example, the UE may switch, upon leaving the dormant state, to a BWP with a largest or smallest bandwidth. Referring to FIG. 21, the UE may choose BWP #2 instead of BWP #1 as the wake-up BWP in response to BWP #2 has the largest bandwidth.

Figure 22:
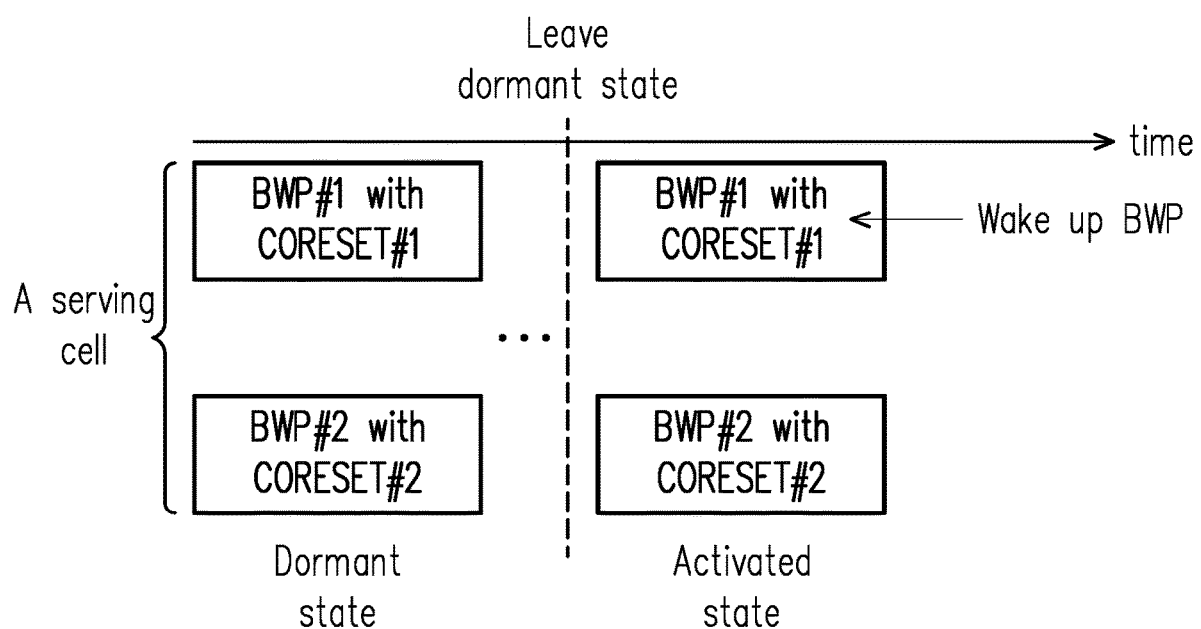
FIG. 22 is a schematic diagram of BWP operation for the UE upon the SCell leaving the dormant state based on a CORESET ID of a BWP according to an embodiment of the disclosure.

FIG. 22 is a schematic diagram of BWP operation for the UE upon the SCell leaving the dormant state based on a CORESET ID of a BWP according to an embodiment of the disclosure.

The UE may switch, upon leaving the dormant state, to a BWP with the highest or lowest CORESET ID. Referring to FIG. 22, the UE may choose BWP #1 instead of BWP #2 as the wake-up BWP in response to BWP #1 has the lowest CORESET ID.

Figure 23:
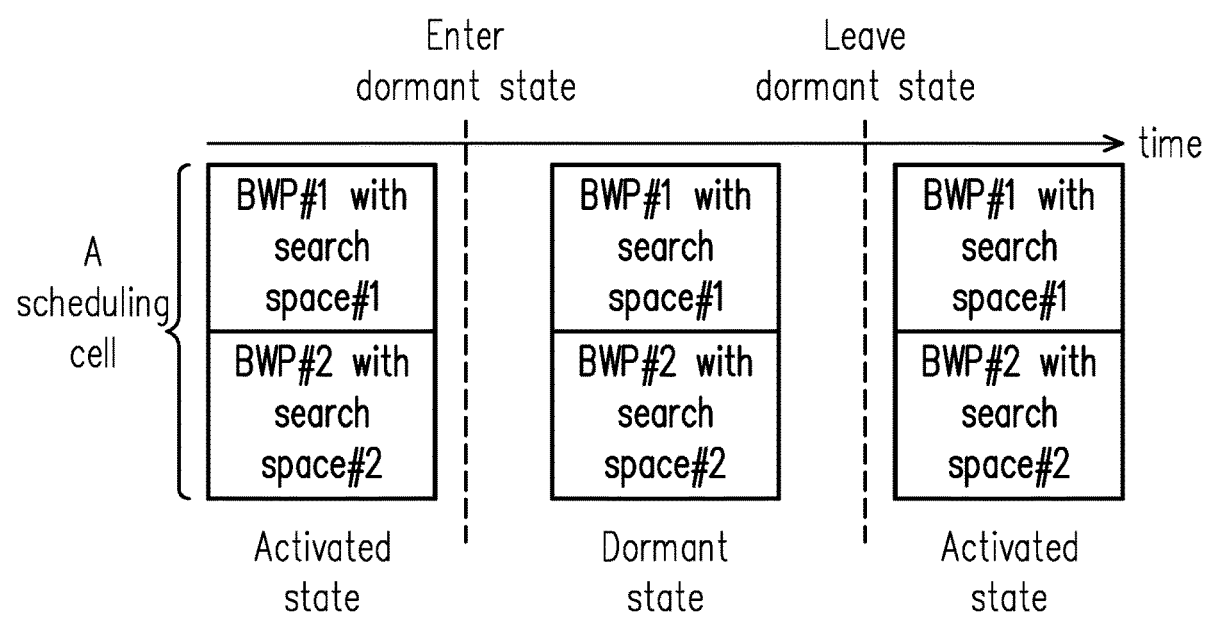
FIG. 23 is a schematic diagram of BWP operation for the UE upon the SCell leaving the dormant state based on a search space of a BWP according to an embodiment of the disclosure.

FIG. 23 is a schematic diagram of BWP operation for the UE upon the SCell leaving the dormant state based on a search space of a BWP according to an embodiment of the disclosure. The UE may switch, upon leaving the dormant state, to a BWP corresponding to at least one search space ID, wherein the at least one search space ID is same as the search space ID corresponding to an active BWP which the UE stay in before entering the dormant state. Referring to FIG. 23, the UE may stay in BWP #1 of the scheduling cell before entering the dormant state, wherein BWP #1 may correspond to search space #1. Then, upon leaving the dormant state, the UE may determine BWP #1 as wake-up BWP according to search space #1.

Figure 24:
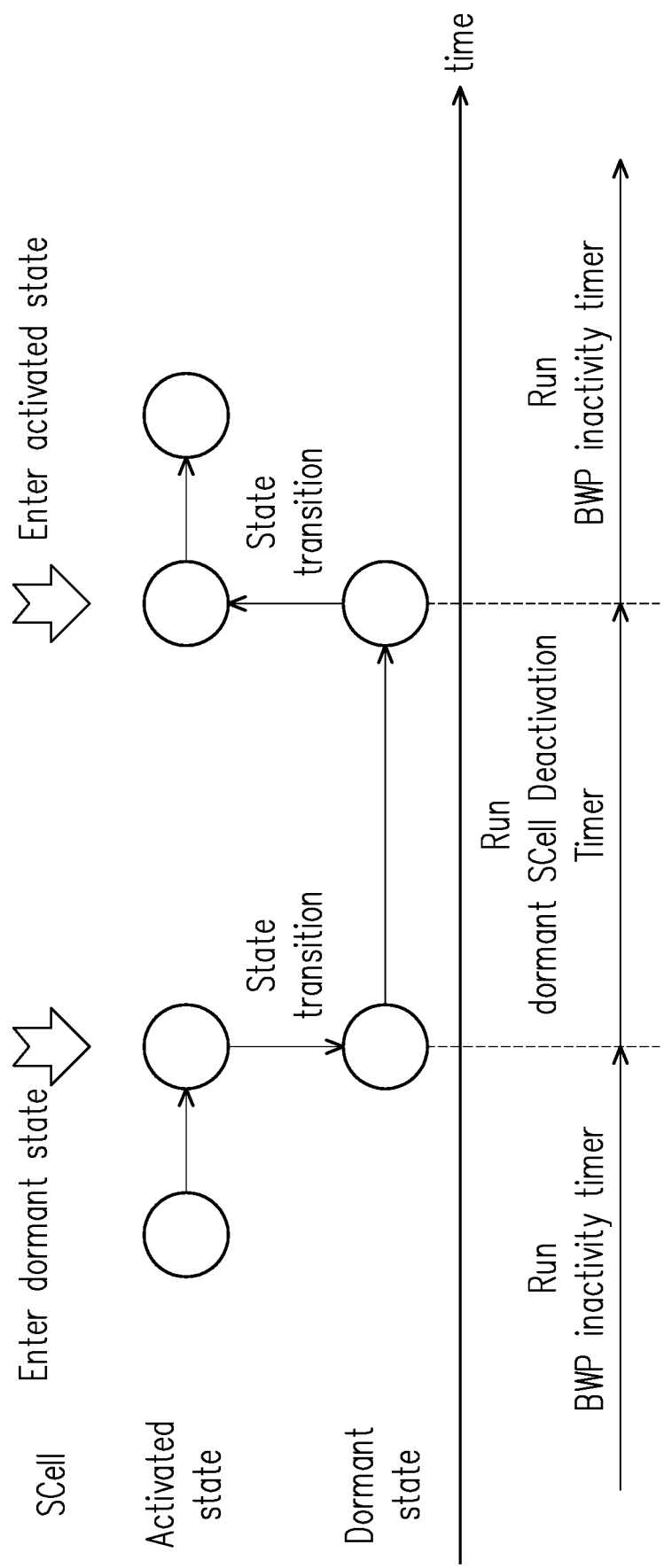
FIG. 24 is a schematic diagram of operation of timers upon entering or leaving the dormant state according to an embodiment of the disclosure.

FIG. 24 is a schematic diagram of operation of timers upon entering or leaving the dormant state according to an embodiment of the disclosure. The inter-action between the timers in MAC layer needs to be considered for transiting the SCell to the dormant state. A first timer such as a BWP inactivity timer of the SCell may run when the SCell or the UE operating in a non-default BWP. Upon the BWP inactivity timer expiry, the UE may switch to a specific BWP such as a default BWP. The BWP inactivity timer may implicitly or explicitly be indicated to run, stop, or suspend upon the SCell entering the dormant state, and may implicitly or explicitly be indicated to start, re-start, or resume upon the SCell leaving the dormant state and entering the activated state. A second timer such as a dormantSCellDeactivationTimer may start running upon the SCell entering the dormant state. Upon the dormantSCellDeactivationTimer expiry, the SCell or the UE may enter the deactivated state. The status of the BWP inactivity timer and the dormantSCellDeactivationTimer may be considered separately by the SCell or by the UE, as shown in table 3.

TABLE 3

| BWP inactivity timer | dormantSCellDe-activationTimer | UE may |
| --- | --- | --- |
| running | running | Keep staying in the dormant state |
| running | expiry | enter the deactivated state (or leave the dormant state) |
| expiry | running | perform BWP switching (to default BWP) and stay in the dormant state |
| expiry | expiry | enter the deactivated state (or leave the dormant state) |

Figure 25:
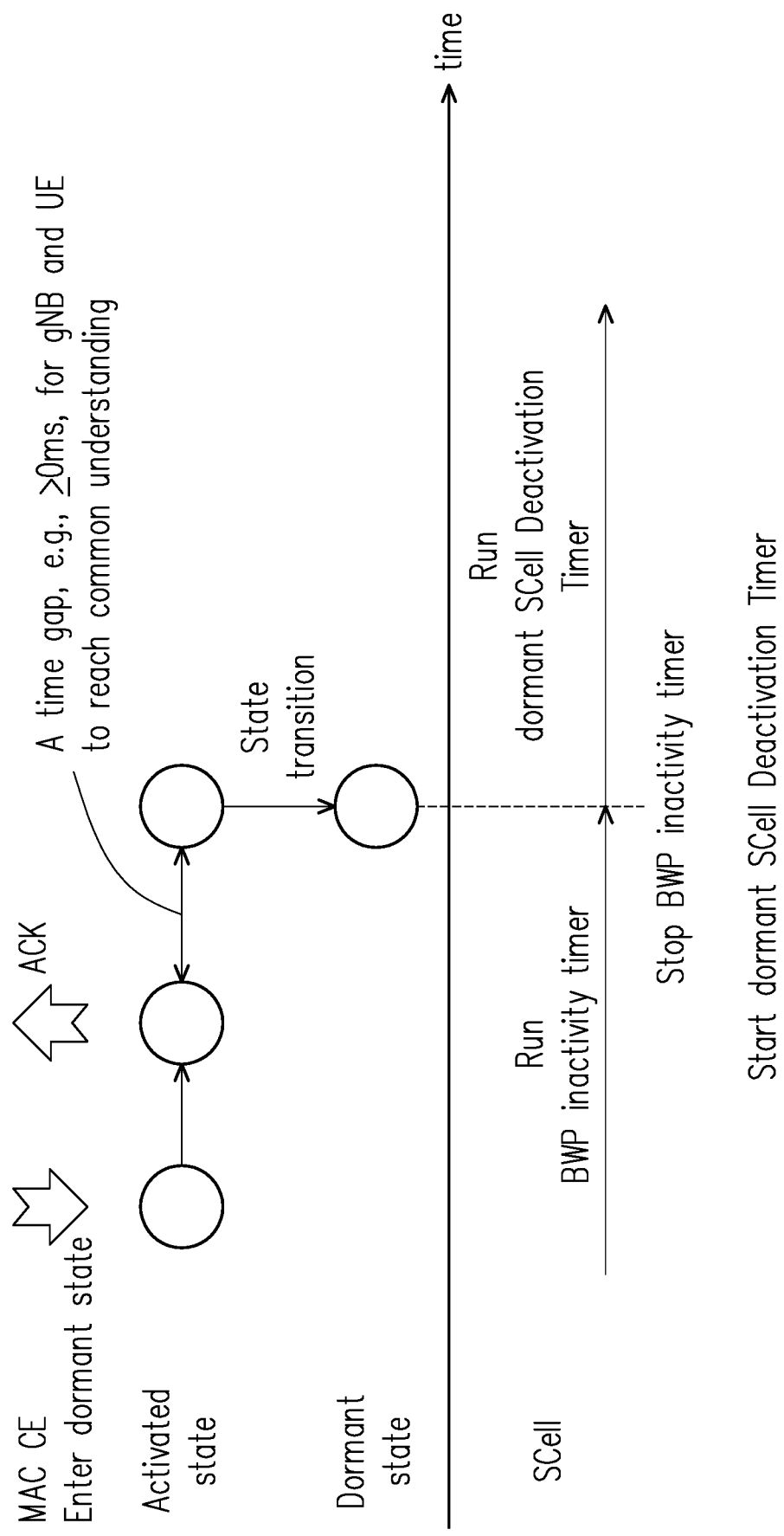
FIG. 25 is a schematic diagram of operation of timers upon entering the dormant state according to an embodiment of the disclosure.

In some embodiment, the status of the BWP inactivity timer and the dormantSCellDeactivationTimer may be considered jointly. FIG. 25 is a schematic diagram of operation of timers upon entering the dormant state according to an embodiment of the disclosure. The BWP inactivity timer may run while the UE is in the activated state. That is, the BWP inactivity timer may run while the UE staying in the non-dormant BWP. The UE in the activated state may receive a signaling such as a MAC CE. The UE may transmit an acknowledgement (ACK) in response to the MAC CE. After transmitting the ACK, the UE may wait for a time gap (e.g., greater than or equal to 0 ms) so that the base station (e.g., gNB) and the UE may reach common understanding during the time gap. After the ACK is transmitted for a time gap, the BWP inactivity timer may stop or suspend, the dormantSCellDeactivationTimer may start running, and the UE may be transited from the activated state to the dormant state. In other words, the dormantSCellDeactivationTimer may start running upon the UE switching from the activated state to the dormant state. The time gap may be pre-determined for the base station and the UE to reach common understanding while performing state transition.

Figure 26:
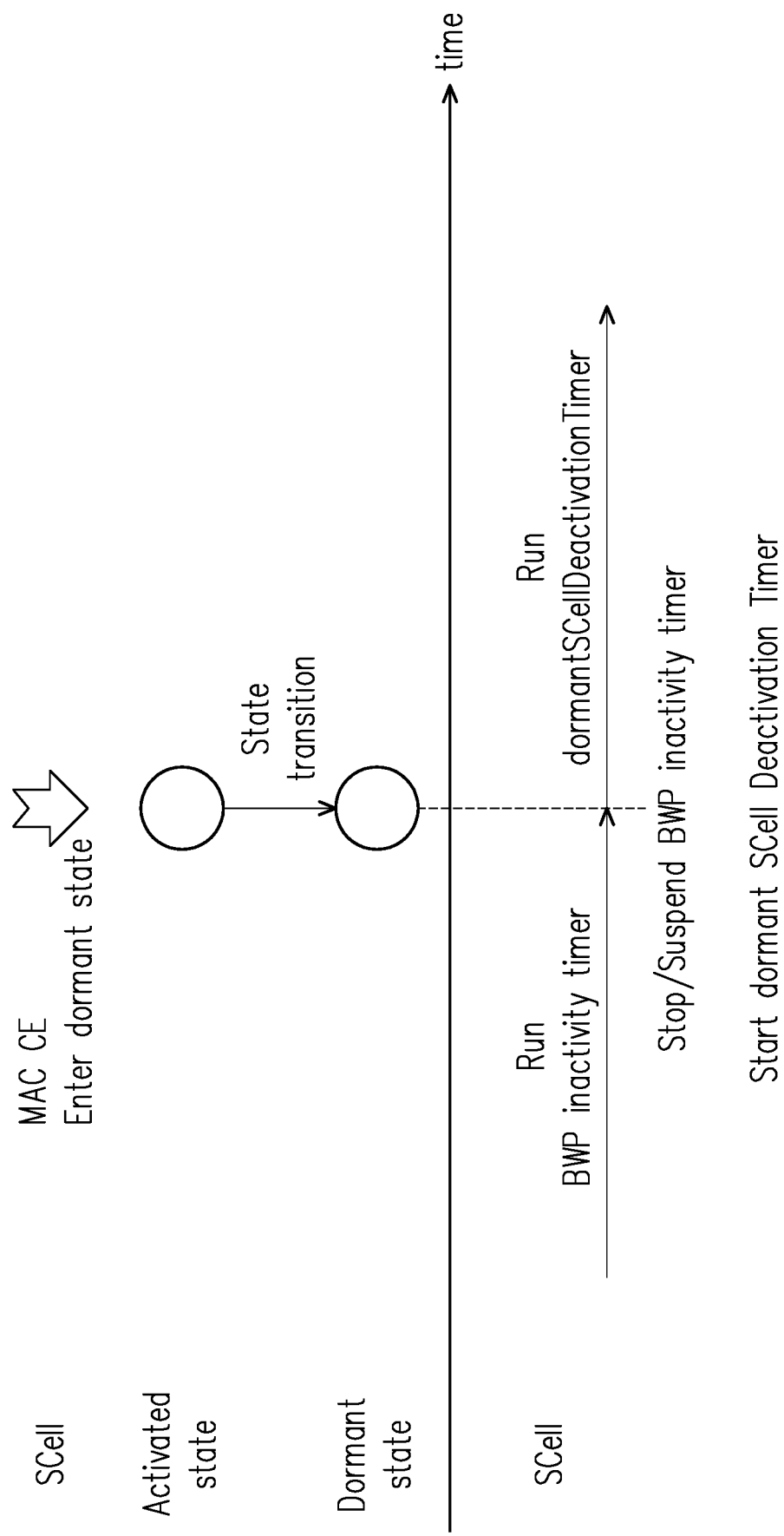
FIG. 26 is a schematic diagram of operation of timers upon entering the dormant state according to another embodiment of the disclosure.

FIG. 26 is a schematic diagram of operation of timers upon entering the dormant state according to another embodiment of the disclosure. The BWP inactivity timer may run while the UE is in the activated state. The UE in the activated state may receive a signaling such as a MAC CE, wherein the MAC CE may indicate the UE to enter the dormant state. In response to receiving the MAC CE, the BWP inactivity timer may stop or suspend, the dormantSCellDeactivationTimer may start running, and the UE may be transited from the activated state to the dormant state. That is, the dormantSCellDeactivationTimer may start running upon the UE switching to a dormant BWP. If the UE determine to stay in the same BWP upon entering the dormant state from the activated state, the UE may be transited from the activated state to the dormant state right after the reception of the MAC CE.

Figure 27:
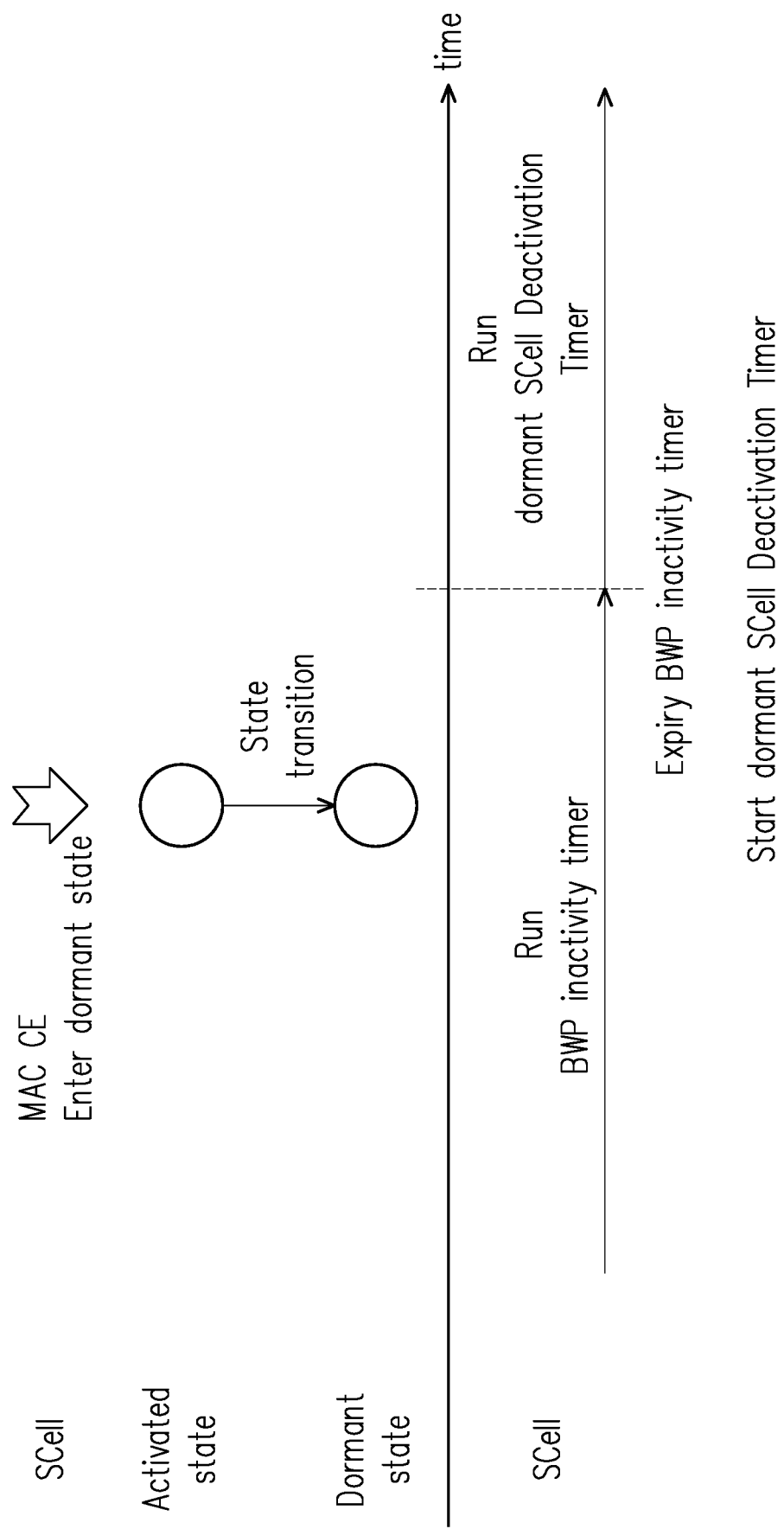
FIG. 27 is a schematic diagram of operation of timers upon entering the dormant state according to the other embodiment of the disclosure.

FIG. 27 is a schematic diagram of operation of timers upon entering the dormant state according to the other embodiment of the disclosure. The BWP inactivity timer may run while the UE is in the activated state. The UE in the activated state may receive a signaling such as a MAC CE, wherein the MAC CE may indicate the UE to enter the dormant state. In response to receiving the MAC CE, the BWP inactivity timer may keep running and the UE may be transited from the activated state to the dormant state. Upon the BWP inactivity timer expiry, the dormantSCellDeactivationTimer may start running and the UE may switch to a default BWP. In an embodiment, if the BWP inactivity timer expires between the reception of the MAC CE (e.g., hibernation MAC CE) and the state transition triggering, the UE may switch to, for example, a default BWP, a first dormant BWP, or a BWP determined according to UE preference (e.g., no BWP switching). In an embodiment, the UE may not perform BWP switching if the BWP inactivity timer expires.

Figure 28:
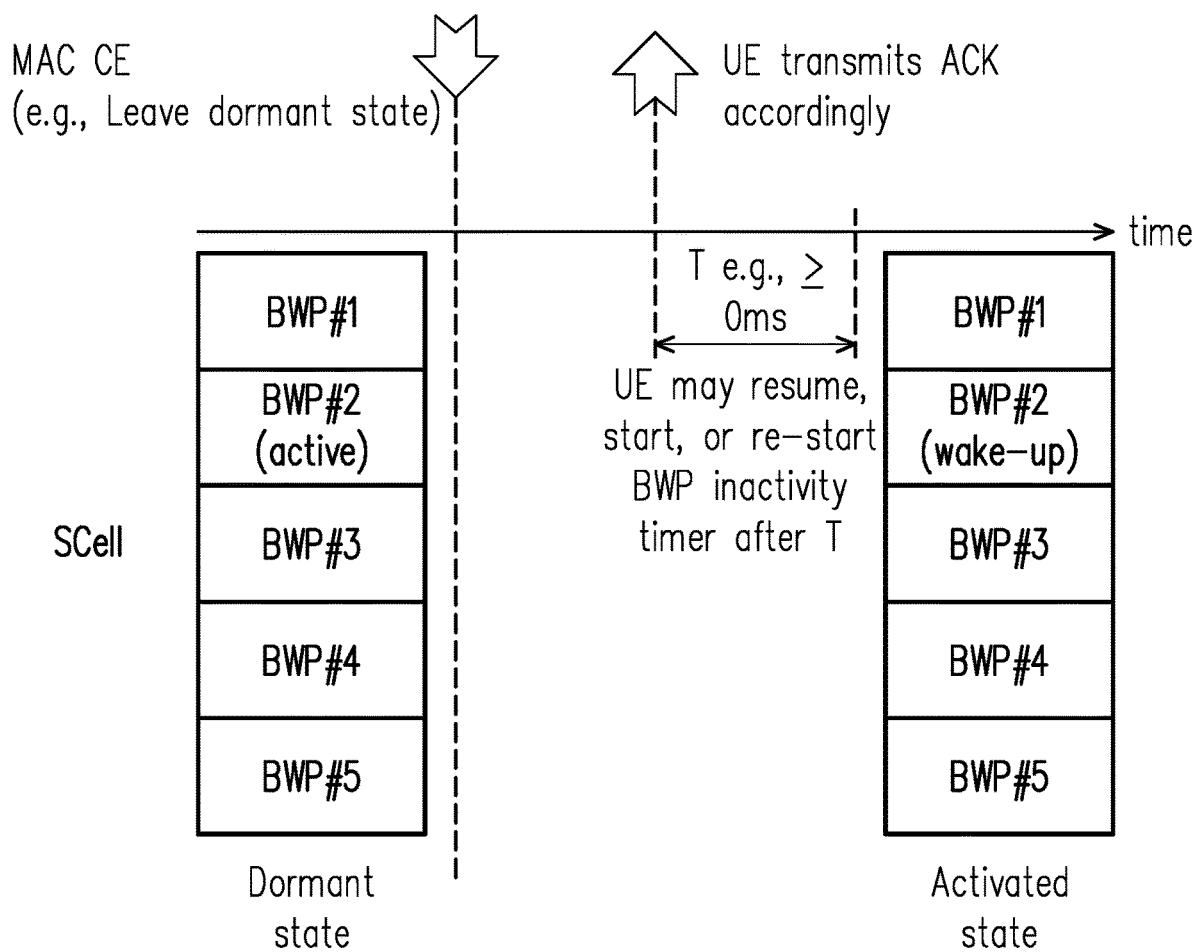
FIG. 28 is a schematic diagram of operation of timer upon leaving the dormant state according to an embodiment of the disclosure.

FIG. 28 is a schematic diagram of operation of timer upon leaving the dormant state according to an embodiment of the disclosure. The UE in the dormant state may receive a signaling (e.g., MAC CE or DCI), wherein the signaling may indicate the UE a BWP and may indicate the UE to leave the dormant state. The signaling may be carried by a physical downlink shared channel (PDSCH) or a PDCCH. The UE may switch to the indicated BWP (e.g., wake-up BWP or non-dormant BWP) upon leaving the dormant state according to the signaling. If the indicated BWP is not a specific BWP such as a default BWP, a timer such as a BWP inactivity timer, if configured, may resume, start, or re-start after the UE transmitting a hybrid automatic repeat request acknowledgement (HARQ-ACK) corresponding to the MAC CE (e.g., hibernation MAC CE) for a timer interval T, wherein the timer interval may be greater than or equal to 0 ms.

Figure 29:
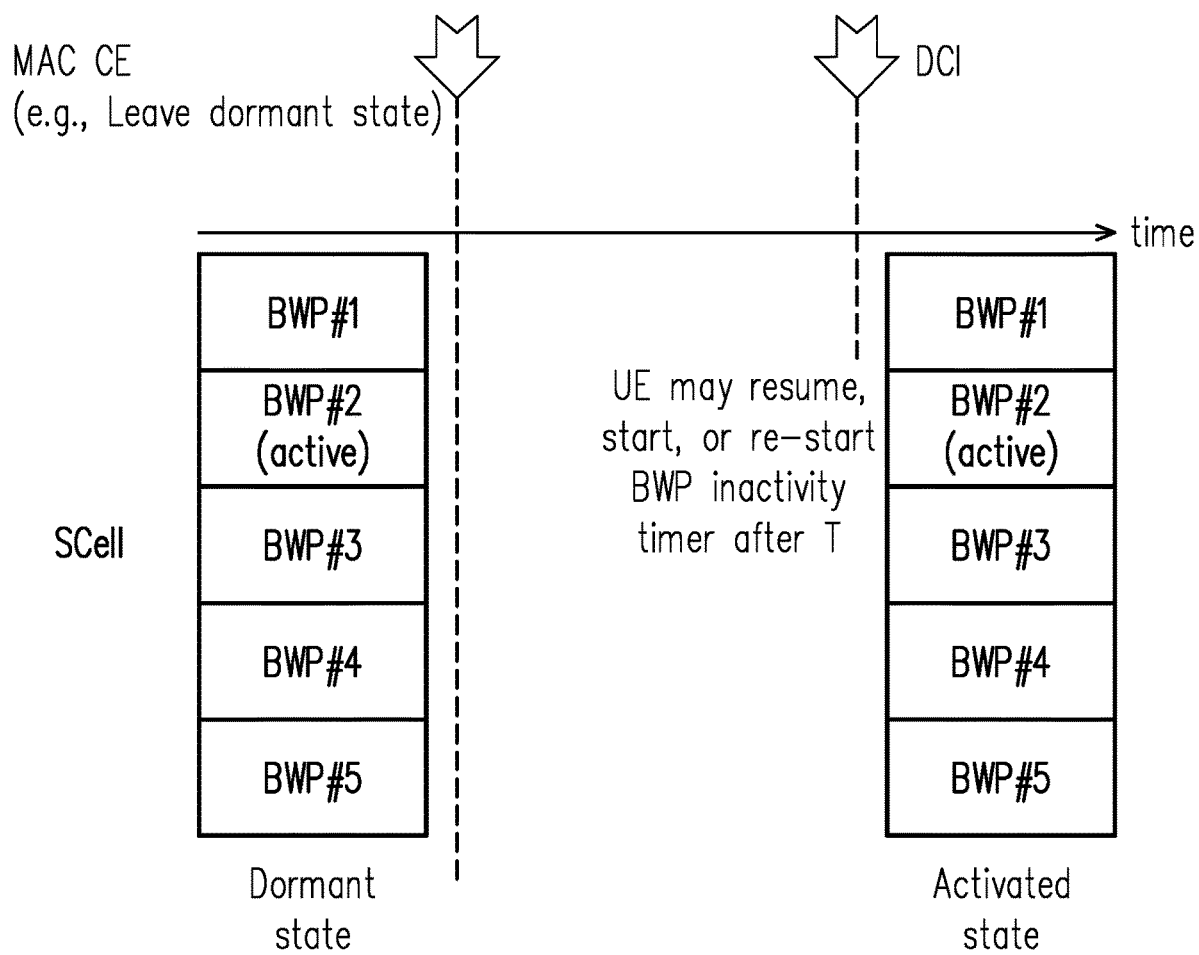
FIG. 29 is a schematic diagram of operation of timer upon leaving the dormant state according to another embodiment of the disclosure.

FIG. 29 is a schematic diagram of operation of timer upon leaving the dormant state according to another embodiment of the disclosure. The UE in the dormant state may receive a signaling (e.g., MAC CE or DCI), wherein the signaling may indicate the UE a BWP and may indicate the UE to leave the dormant state. The signaling may be carried by a PDSCH or a PDCCH. The UE may switch to the indicated BWP (e.g., wake-up BWP) upon leaving the dormant state according to the signaling. If the indicated BWP is not a specific BWP such as a default BWP, a timer such as a BWP inactivity timer, if configured, may resume, start, or re-start in response to the UE receiving a DCI after leaving the dormant state.

A time gap may be pre-determined for gNB and UE to reach common understanding in state transition and the validation of gNB indication (e.g., UE may be expected to receive). In an embodiment, the time gap may be between the time point of receiving (e.g., by the UE) the MAC CE (e.g., hibernate MAC CE) to the time point after transmitting the corresponding ACK for a time interval. In another embodiment, the time gap may be between the time point of receiving (e.g., by the UE) the MAC CE (e.g., hibernate MAC CE) to the time point of receiving (e.g., by the UE) the PDCCH (e.g., DCI).

In an embodiment, a UE may resume, start, or re-start the BWP inactivity timer associated with the active (DL) BWP upon receiving a PDCCH on the active BWP, wherein the PDCCH may be addressed to cell radio network temporary identifier (C-RNTI) or configured scheduling radio network temporary identifier (CS-RNTI) which indicates the reception of downlink assignment or uplink grant.

In an embodiment, a UE may resume, start, or re-start the BWP inactivity timer associated with the active (DL) BWP upon receiving a PDCCH associated with the active BWP (e.g., the PDCCH may be received on a BWP different from said active BWP), wherein the PDCCH may be addressed to cell radio network temporary identifier (C-RNTI) or configured scheduling radio network temporary identifier (CS-RNTI) which indicates the reception of downlink assignment or uplink grant.

In an embodiment, the UE may resume, start, or re-start the BWP inactivity timer associated with the active (DL) BWP upon receiving a MAC packet data unit (PDU), wherein the PDU may be transmitted via a configured uplink grant or a configured downlink assignment.

Figure 30:
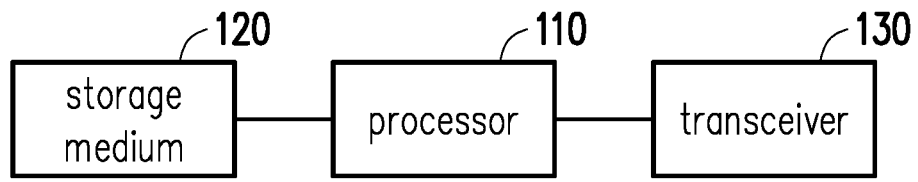
FIG. 30 is a schematic diagram of a UE according to another embodiment of the disclosure.

FIG. 30 is a schematic diagram of a UE 100 according to another embodiment of the disclosure. The UE 100 may include a processor 110, a storage medium 120, and a transceiver 130. The processor 110 is coupled to the storage medium 120 and the transceiver 130 and is configured to at least to implement the method used by a UE to perform BWP switching or state transition as described in FIG. 4-29 as well as its exemplary embodiment and alternative variations.

The processor 110 could be implemented by using programmable units such as a micro-processor, a micro-controller, a DSP chips, FPGA, etc. The functions of the processor 110 may also be implemented with separate electronic devices or ICs. It should be noted that the functions of processor 110 may be implemented with either hardware or software.

The storage medium 120 may be, for example, any type of fixed or removable random access memory (RAM), a read-only memory (ROM), a flash memory, a hard disk drive (HDD), a solid state drive (SSD) or similar element, or a combination thereof, configured to record a plurality of modules or various applications executable by the processor 110.

The transceiver 130 may be configured to transmit and receive signals respectively in the radio frequency or in the mmWave frequency. The transceiver 130 may also perform operations such as low noise amplifying, impedance matching, frequency mixing, up or down frequency conversion, filtering, amplifying, and so forth. The transceiver 130 may include one or more digital-to-analog (D/A) converters or analog-to-digital (A/D) converters which are configured to convert from an analog signal format to a digital signal format during uplink signal processing and from a digital signal format to an analog signal format during downlink signal processing. The transceiver 130 may include an antenna array which may include one or multiple antennas to transmit and receive omni-directional antenna beams or directional antenna beams.

Figure 31:
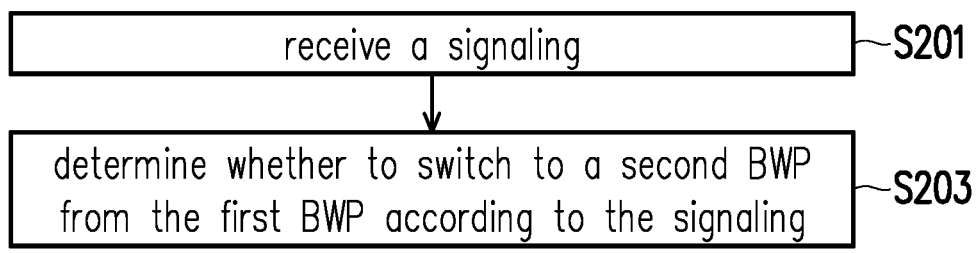
FIG. 31 is a flowchart of a method for BWP operating according to an embodiment of the disclosure.

FIG. 31 is a flowchart of a method for BWP operating according to an embodiment of the disclosure, wherein the method may be implemented by the UE 100 in a first BWP. In step S201, the UE 100 may receive a signaling. In step S203, the UE 100 may determine whether to switch to a second BWP from the first BWP according to the signaling.

In view of the aforementioned descriptions the present disclosure is suitable for being used by a UE served by a SCell with multiple BWPs. The UE may determine the BWP to switch to upon the network transitions the SCell to enter or leave the dormant state according to the present disclosure. The BWP inactivity timer may be configured to run, stop, or suspend upon entering the dormant state, and may be configured to start, re-start, or resume upon leaving the dormant state (e.g., entering the activated state).

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A method for bandwidth part (BWP) operating of a serving cell, adapted to a user equipment (UE) in a first BWP, comprising:
 receiving a signaling;
 determining whether to switch to a second BWP from the first BWP according to the signaling; and
 stopping a timer, not monitoring a physical downlink control channel (PDCCH), performing a channel state information (CSI) measurement, and stopping uplink transmission for the serving cell when staying in the first BWP, wherein the first BWP is a dormant BWP.

2. The method of claim 1, wherein the second BWP is a non-dormant BWP.

3. The method of claim 1, wherein the signaling indicates the second BWP and the second BWP is a non-dormant BWP.

4. The method of claim 1, further comprising:
 switching to the second BWP from the first BWP according the signaling, wherein the signaling indicates that the second BWP is a non-dormant BWP.

5. The method of claim 1, wherein the second BWP is a pre-configured BWP.

6. The method of claim 1, wherein the step of determining whether to switch to the second BWP from the first BWP according to the signaling comprising:

determining not to switch to the second BWP in response to the signaling indicating the UE to stay in the dormant BWP; or determining to switch to the second BWP in response to the signaling indicating the UE to stay in a non-dormant BWP.

7. The method of claim 1, further comprising:
staying in the first BWP in response to determining not to switch to the second BWP.

8. The method of 1, further comprising:
stopping the timer in response to determining not to switch to the second BWP from the first BWP.

9. The method of claim 1, further comprising:
switching to the second BWP.

10. The method of claim 1, further comprising:
determining the second BWP from a plurality of BWPs according to at least one of the followings:
a power of the UE, a bandwidth of the second BWP, a subcarrier spacing of the second BWP, a BWP identity (ID) of the second BWP, a CORESET ID corresponding to the second BWP, a search space ID corresponding to the second BWP, or a physical downlink control channel (PDCCH) monitoring occasion of the second BWP.

11. The method of claim 1, further comprising:
receiving a second signaling, wherein the second BWP is determined according to the second signaling.

12. The method of claim 11, wherein the second signaling comprises a BWP identity (ID) of the second BWP, wherein the second BWP is determined according to the BWP ID.

13. The method of claim 11, wherein the second signaling comprises a BWP hopping pattern corresponding to one or more BWPs, wherein the second BWP is determined according to the BWP hopping pattern.

14. The method of claim 1, further comprising:
transmitting a channel state information report comprising a BWP identity (ID) of the dormant BWP.

15. The method of claim 1, further comprising:
running a BWP inactivity timer; and
determining not to switch to the second BWP in response to the BWP inactivity timer expiry.

16. The method of claim 1, further comprising:
receiving a second signaling after switching to the second BWP; and
starting running the timer in response to the second signaling.

17. A user equipment (UE) in a first bandwidth part (BWP), comprising:
a transceiver; and
a processor, coupled to the transceiver, wherein the processor is configured to:
receive a signaling;
determine whether to switch to a second BWP from the first BWP according to the signaling; and
stop a timer, not monitor a physical downlink control channel (PDCCH), performing a channel state information (CSI) measurement, and stop uplink transmission for the serving cell when staying in the first BWP, wherein the first BWP is a dormant BWP.

* * * * *